United States Patent
Qian

(10) Patent No.: US 8,879,175 B2
(45) Date of Patent: Nov. 4, 2014

(54) GAME CAMERA HAVING AN ELECTROMECHANICAL DEVICE FOR SWITCHING AN OPTICAL LENS FILTER

(76) Inventor: Benning Qian, Ningbo (CN)

( * ) Notice: Subject to any disclaimer, the term of this patent is extended or adjusted under 35 U.S.C. 154(b) by 132 days.

(21) Appl. No.: 13/572,804

(22) Filed: Aug. 13, 2012

(65) Prior Publication Data

US 2012/0307127 A1  Dec. 6, 2012

Related U.S. Application Data

(63) Continuation-in-part of application No. 12/701,353, filed on Feb. 5, 2010, now Pat. No. 8,243,380.

(51) Int. Cl.
  G02B 7/02 (2006.01)
  G02B 26/00 (2006.01)
  G02B 7/00 (2006.01)
  G02B 26/02 (2006.01)

(52) U.S. Cl.
  CPC .............. *G02B 26/007* (2013.01); *G02B 7/005* (2013.01); *G02B 26/023* (2013.01)
  USPC ............ 359/813; 359/821; 359/889; 396/463

(58) Field of Classification Search
  USPC ......... 359/813, 814, 824, 821, 353, 885, 889, 359/892; 348/235, 270, 335, 374; 310/49.13, 156.26, 164; 396/275, 463, 396/661; 335/222
  See application file for complete search history.

(56) References Cited

U.S. PATENT DOCUMENTS

| | | | | |
|---|---|---|---|---|
| 4,715,024 A * | 12/1987 | Musha | .................. | 369/44.21 |
| 4,752,117 A * | 6/1988 | Ichikawa et al. | .............. | 359/814 |
| 7,053,514 B2 * | 5/2006 | Kayama et al. | .......... | 310/156.26 |
| 7,410,310 B2 * | 8/2008 | Kihara | .................. | 396/463 |
| 7,741,940 B2 * | 6/2010 | Kayama et al. | .............. | 335/222 |
| 7,922,403 B2 * | 4/2011 | Kihara | .................. | 396/463 |

* cited by examiner

*Primary Examiner* — Loha Ben
(74) *Attorney, Agent, or Firm* — Head, Johnson & Kachigian, P.C.

(57) ABSTRACT

A digital camera for wild game animals includes a camera having automatic flash, focus, aperture and shutter speed and film advance functions. The camera is mounted within a camera housing adapted for outdoor installation and protection from adverse weather conditions. An electronic control circuit mounted within the camera housing is operably connected to the camera and includes a memory device and a microprocessor for storing and performing a set of programmable functions. The camera is activated by a passive infrared sensor detecting body heat of the animal or group of animals. An electromechanical device mounted within the camera housing selectively inserts an optical lens filter, such as day optical filter and a night optical filter, into an optical path of the camera in accordance with light intensity and/or a signal from a user or timer.

42 Claims, 23 Drawing Sheets

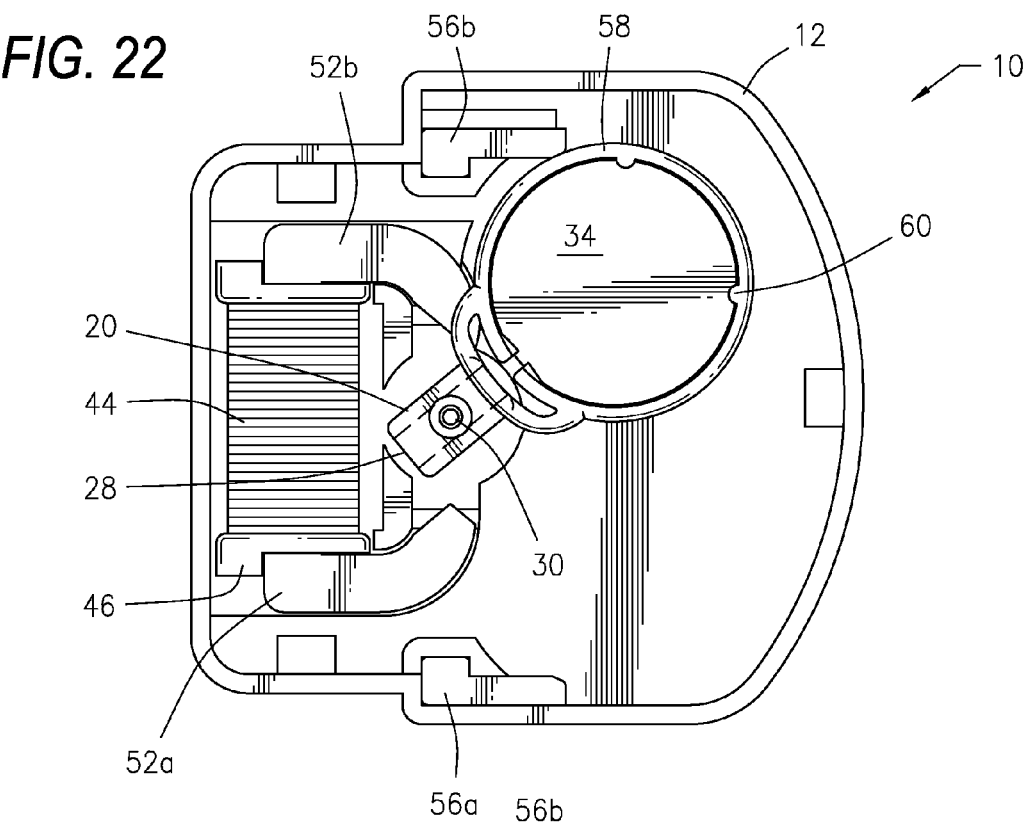
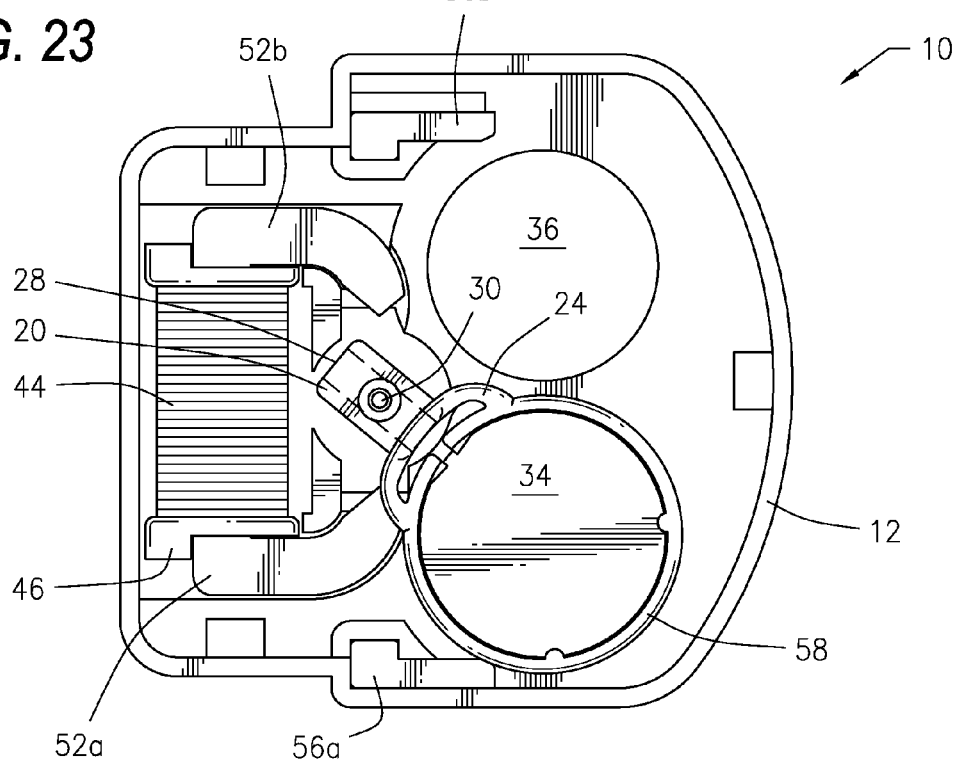

GAME CAMERA HAVING AN ELECTROMECHANICAL DEVICE FOR SWITCHING AN OPTICAL LENS FILTER

CROSS-REFERENCE TO RELATED APPLICATIONS

This application claims priority to and is a continuation-in-part patent application of U.S. patent application Ser. No. 12/701,353, filed Feb. 5, 2010, now U.S. Pat. No. 8,243,380, issued Aug. 14, 2012, which is incorporated herein by reference in its entirety.

BACKGROUND OF THE INVENTION

1. Field of the Invention

This invention relates generally to a game camera having an electromechanical device for switching an optical lens filter, and more particularly to a game camera having an electromechanical device for selectively inserting the optical lens filter into an optical path of the camera.

2. Description of the Related Art

Surveillance cameras for photographing game animals and other wildlife have become popular as the technology of such cameras has improved. These advanced cameras utilize a relatively inexpensive fully automatic camera which provides automatic focus, flash, aperture and shutter speed and film advance functions. Such cameras are mounted along trails, salt licks, feeders and in other areas known to be frequented by game animals and other wildlife. By using these cameras, wildlife agencies may identify species within the area of study and determine the density and health of the population. Wildlife agencies are not the only purchasers of game cameras and they are also popular with sportsmen hunters who use game cameras to identify trophy animals within the study area. Especially popular with deer hunters, a hunter may use several game cameras to determine the location and routines of large bucks. The surveillance camera is mounted along a trail or watering hole and is left for several days or several weeks until the person returns and unloads the film for processing.

These cameras are designed to take a photograph upon sensing an animal within a preselected target area. Sensors for some cameras include photoelectric eyes which sense an interruption in a light beam between emitters and reflectors. Other types of sensors used are infrared sensors which sense the body heat of an animal. The sensitivity of an infrared receiver may be selected so as to trigger the game camera shutter release only upon receiving an infrared intensity above a given threshold, such as a level associated with a large game animal such as a trophy deer instead of the local skunk passing through. Moreover, the game camera is left out in the field during daylight and nighttime conditions and necessitates day/night enable capabilities.

It is therefore desirable to provide a game camera having an electromechanical device for selective and/or automated switching an optical lens filter for day/night operations.

It is further desirable to provide a game camera having an electromechanical device for selective switching between at least one optical lens filter, such as between a day and night optical lens filter, between a first position and a second position in order to selectively insert the optical lens filter into an optical path of the camera.

SUMMARY OF THE INVENTION

In general, in a first aspect, the claimed invention relates to a digital game scouting camera for taking an image of an animal or group of animals. The camera is enclosed in a camera housing, and an electronic control circuit is mounted within the camera housing and operably connected to the camera. The camera housing may be constructed as a main body and a removable cover, each being weatherproof and from an impact resistant plastic. The camera also includes various system resources, such as a memory device and a microprocessor for storing and performing a set of programmable functions. In addition, the camera may include a passive infrared sensor that detects body heat of the animal or group of animals to be photographed. An electromechanical device is also enclosed within the camera housing for selectively inserting an optical lens filter, such as day optical filter and a night optical filter, into an optical path of the camera in accordance with light intensity and/or a signal from a user or timer.

The electromechanical device includes an optical lens filter, a primary magnet and a support element having a secondary magnet. The support element is pivotally secured to the electromechanical device about a pivot axis, and utilizing the magnetic fields generated by the electromechanical device, the primary magnet opposes the secondary magnet to pivot the support element about the pivot axis to selectively insert the optical lens filter into the optical path of the camera. The primary magnet may be an electromagnet, and the secondary magnet may be a permanent magnet. The electromagnet can be constructed from an electromagnetically inductive coil wound around a bobbin, with the bobbin having an axial channel with an armature disposed therein. The axial channel of the bobbin may be aligned substantially perpendicular to the pivot axis of the support element. Further, the armature may be formed by a pair of pole pieces constructed of a ferromagnetic metal or a ferromagnetic compound directing the magnetic field generated by the electromagnet towards the permanent magnet.

The support element of the electromechanical device may be constructed as a body having opposing trunnions. The trunnions are axially spaced and coaxially aligned along the pivot axis and can be rotatably engaged with a device housing enclosing the electromechanical device. The permanent magnet can be retained within an internal cavity of the body, intermediate of the opposing trunnions. Additionally, the pivot axis may be generally aligned intermediate of the magnetic poles of the permanent magnet.

The electromechanical device can be enclosed within a device housing having a housing coverplate. The device housing and the housing coverplate can each include an optical path aperture axially aligned along the optical path of the camera. The device housing can be constructed as a two-part device housing having a first housing part and a second housing part. The support element can be further constructed to include a cantilevered filter arm engaged with the optical lens filter. The optical filter can be slidably disposed and secured within a pocket of the filter arm or can be secured between at least one tab and a shoulder of an outer periphery of the filter arm. Alternatively, the optical lens filter can be disposed and secured within a filter bracket that is slidably mounted within the device housing. The filter bracket is engaged with the filter arm for selectively moving the optical lens filter. Additionally, the support element can include a limiting arm projecting in a direction opposing the filter arm. The limiting arm can be disposed intermediate of upturned arms of a generally U-shaped stopping element to limit the movement of the support element. Alternatively, a pair of stopping elements could be disposed at opposing sides of the device housing for engaging the filter arm.

In general, in a second aspect, the claimed invention relates to an electromechanical device for selectively inserting an optical lens filter into an optical path of a digital camera. The electromechanical device includes a device housing having a housing coverplate removably attached, each of which may include an optical path aperture. In addition, the electromechanical device includes an electromagnet constructed from an electromagnetically inductive coil wound around a bobbin. The bobbin has an axial channel with a generally U-shaped armature disposed therein. The electromechanical device further includes a support element having a body and a cantilevered filter arm. The body has a magnet and opposing trunnions axially spaced and coaxially aligned along an axis. The electromechanical device further includes at least one optical lens filter. The opposing magnetic fields generated in the electromechanical device by the electromagnet and the magnet pivot the support element about the axis to selectively move the optical lens filter.

Moreover, the axial channel of the bobbin may be aligned substantially perpendicular to the pivot axis. The generally U-shaped armature can be constructed from a pair of pole pieces, which direct the magnetic field generated by the electromagnet towards the magnet, which can be a permanent magnet. The opposing trunnions of the support element may be rotatably engaged with the device housing and the housing coverplate. In addition, the electromechanical device can include at least one stopping element disposed within the device housing for limiting the movement of the support element. The support element could also have a limiting arm projecting in a direction opposing the cantilevered filter arm, with the limiting arm engaged with the stopping element. The optical lens filter can be retained by the filter arm along an outer periphery having at least one tab and a shoulder or a pocket into which said optical lens filter is slidably disposed and secured. The optical lens filter may alternatively be retained by a filter bracket that is engaged with the filter arm. The filter bracket includes an optical path aperture and a generally arcuate channel having a shaft of the filter arm disposed therein. The filter bracket may be slidably engaged with the device housing for selectively moving the optical lens filter.

BRIEF DESCRIPTION OF THE DRAWINGS

FIG. 22 is a top view of the electromechanical device of FIG. 20 with the housing coverplate removed and an optical lens filter in a first position;

FIG. 23 is a top view of the electromechanical device of FIG. 22 with the optical lens filter in a second position;

Figure 1:
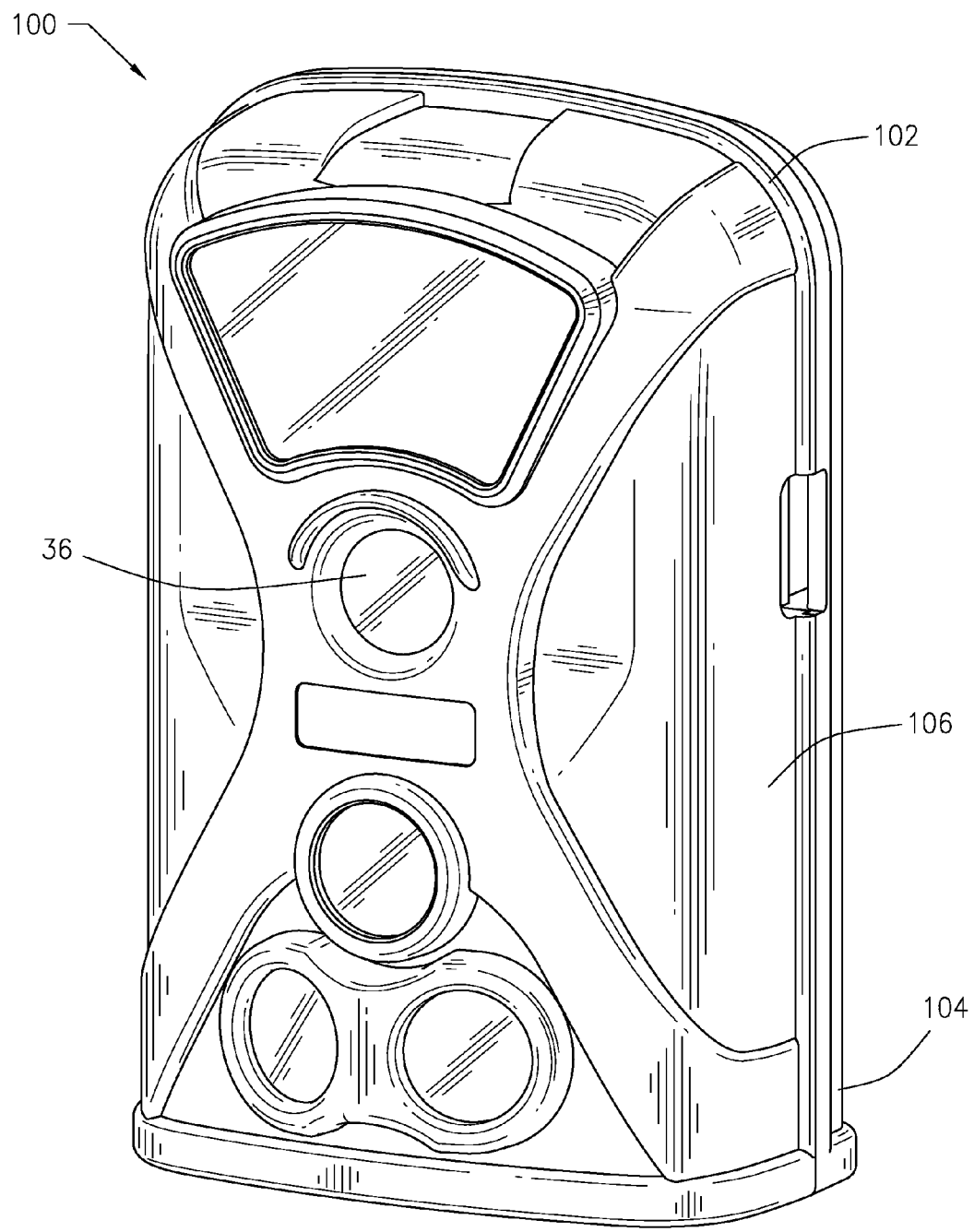
FIG. 1 is a perspective view of an example of a game camera in accordance with an illustrative embodiment of the game camera having an electromechanical device for switching an optical lens filter disclosed herein.

Other advantages and features will be apparent from the following description, and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the construction and the arrangement of the structural and function details disclosed herein without departing from the spirit and scope of this disclosure. It is understood that the devices and methods are not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "forwardly," "horizontally," "downwardly," "upwardly," etc.) should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Figure 2:
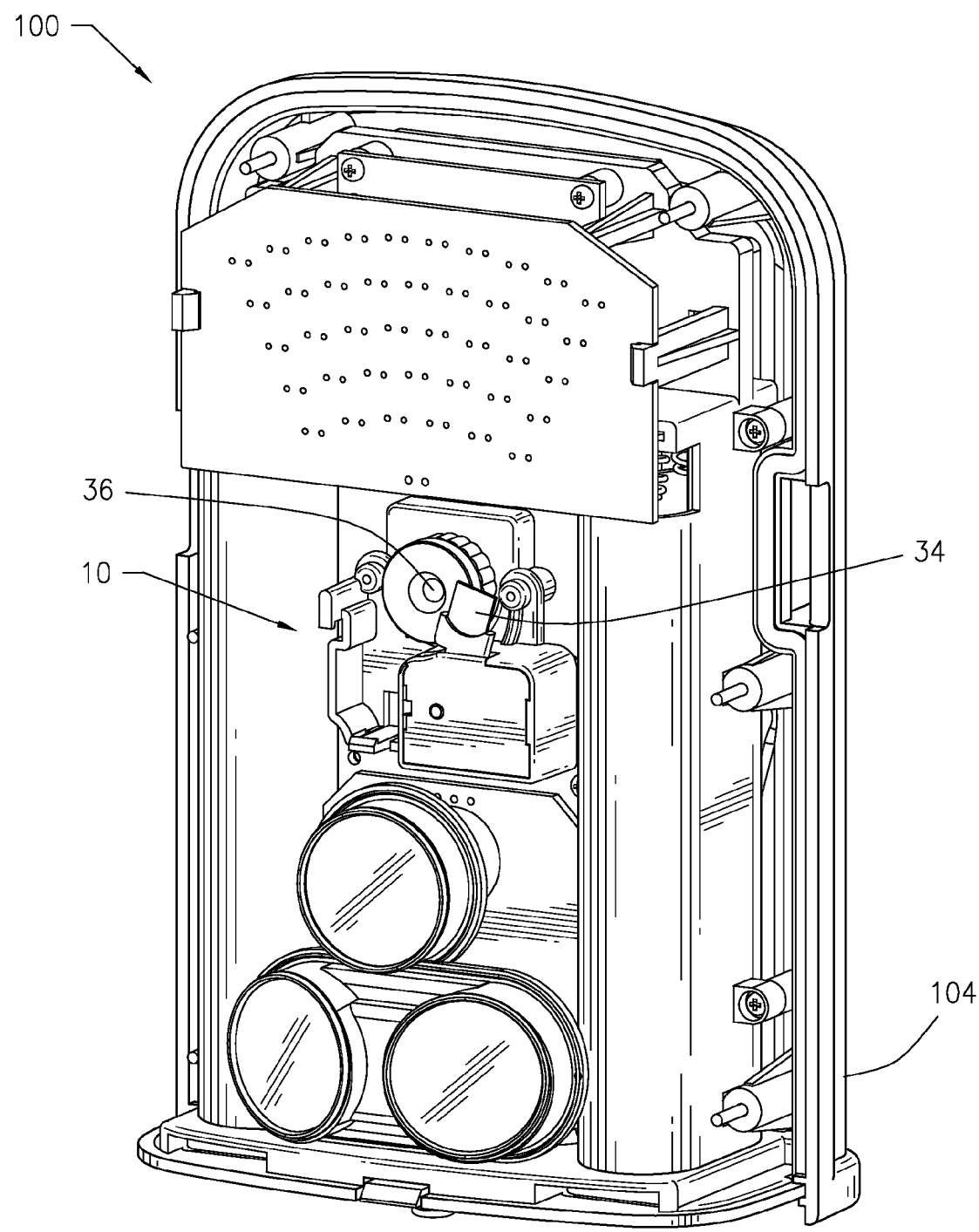
FIG. 2 is a perspective view of an example of an electromechanical device secured to the game camera shown in FIG. 1 with the cover removed.
Figure 3:
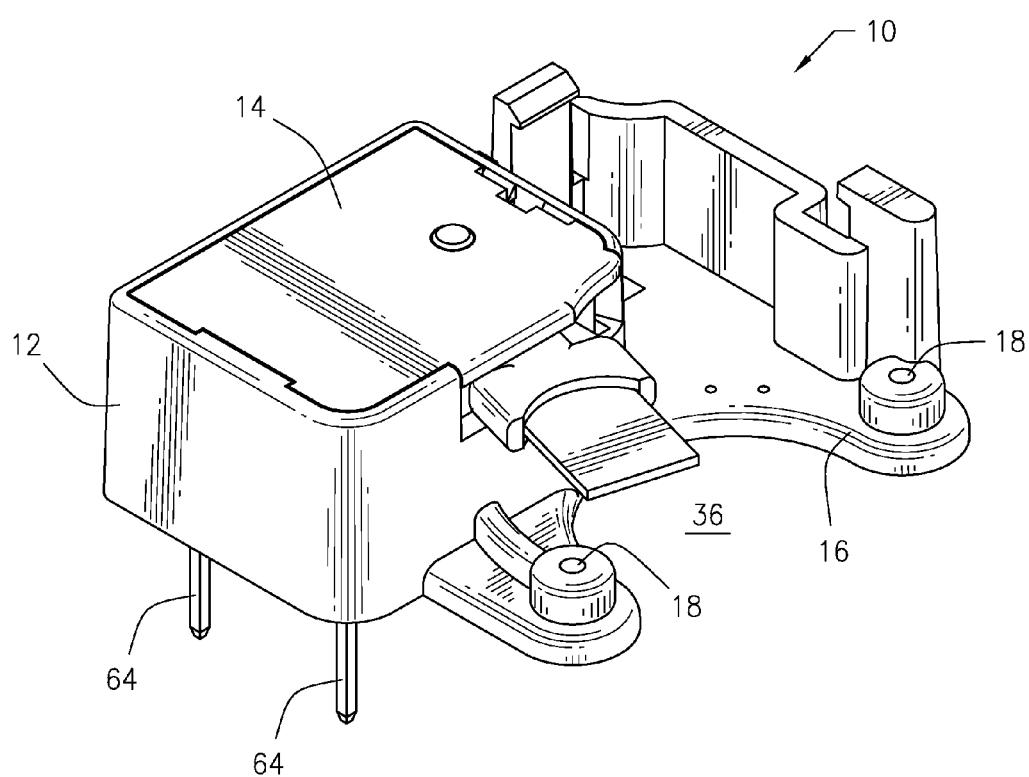
FIG. 3 is a perspective view of an example of an electromechanical device for switching an optical lens filter in a camera in accordance with an illustrative embodiment of the game camera having an electromechanical device for switching an optical lens filter disclosed herein.
Figure 4:
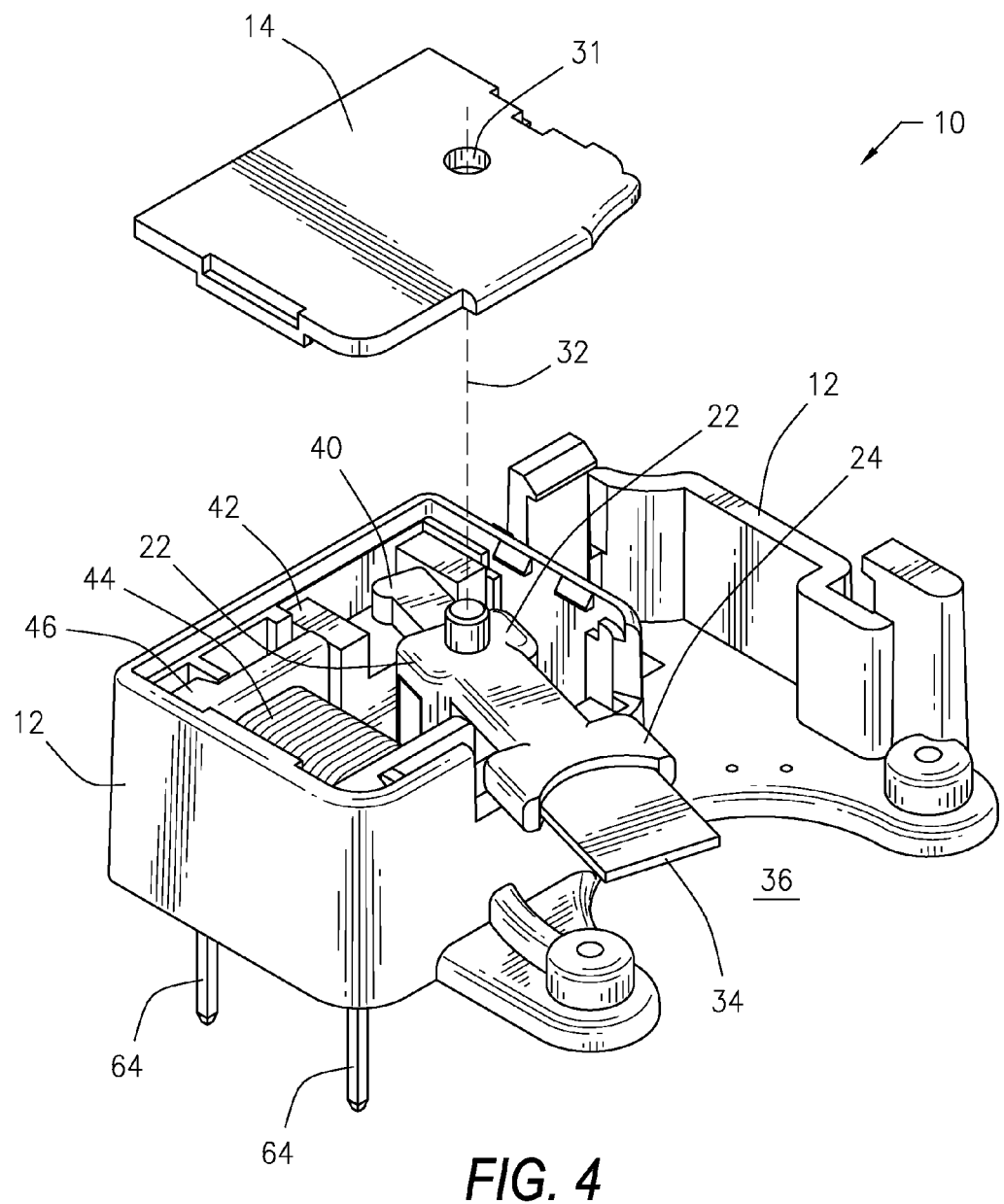
FIG. 4 is a partial exploded view of the electromechanical device shown in FIG. 3.

Referring to the figures of the drawings, wherein like numerals of reference designate like elements throughout the several views, and initially to FIGS. 1 and 2, a camera 100 having a camera housing 102 containing elements as hereinafter disclosed. The game camera 100 is constructed for placement along a game trail or other place where game animals or other wildlife are likely to pass. The camera housing 102 is designed and constructed to withstand the adverse weather conditions normally encountered by outdoor sportsmen and attaches to a support structure, such as by bolting to a tree, post or the like. The camera housing 102 may be constructed from an impact resistant plastic and has a main body 104 with a removable cover 106. The main body 104 holds the components and electronics for operation of the game camera 100. In particular, an electronic control circuit (not shown) mounted within the camera housing 102 is operably connected to the camera 100 and includes various known system resources, such as by way of example, a memory device and a microprocessor for storing and performing a set of programmable functions. The camera 100 may be activated by a passive infrared sensor that detects body heat of the animal or group of animals to be photographed. An electromechanical device 10 is also mounted within the camera housing 102 for selectively inserting an optical lens filter 34, such as a day optical filter and a night optical filter, into an optical path 36 of the camera 100 in accordance with light intensity and/or a signal from a user or timer.

FIGS. 3 through 9 exemplify an embodiment of the electromechanical device 10 for switching an optical lens filter 34 for the game camera 100. The device 10 is at least partially enclosed in a device housing 12 having a housing coverplate 14. The device housing 12 is secured within the camera housing 102, such as by way of a mounting bracket 16 with screws (not shown) engaged through mounting apertures 18. The electromechanical device 10 includes a support element 20 pivotally secured to the device housing 12. The support element 20 include a main body 22 and a cantilevered filter arm 24 rotatably mounted within the device housing 12. The main body 22 has an internal cavity 26 housing a magnetic field source, namely a permanent magnet 28, and opposing trunnions 30 aligned along a pivot axis 32. For example, the trunnions 30 may be respectively rotatably mounted to the device housing 12 and an aperture 31 in the coverplate 14. The filter arm 24 may include or be engaged with an optical lens filter 34. The optical lens filter 34 may be any type of known filter that is inserted into an optical path 36 of the camera 100, such as day optical filter and a night optical filter that are selectively inserted into the optical path 36 in accordance with light intensity and/or a signal from a user or timer.

As illustrated in FIGS. 3 through 9, the filter arm 24 may extend externally of the device housing 12 and overhang into the optical path 36 of the camera 100. The filter arm 24 can include a pocket 38 into which the optical lens filter 34 may be slidably disposed and secured. The support element 20 may also include a limiting arm 40 projecting from the main body 22 in a direction opposing the filter arm 32. The limiting arm 40 is engaged with a generally U-shaped stopping element 42, and in particular the limiting arm 40 is positioned intermediate of the upturned arms forming the stopping element 42.

Figure 5:
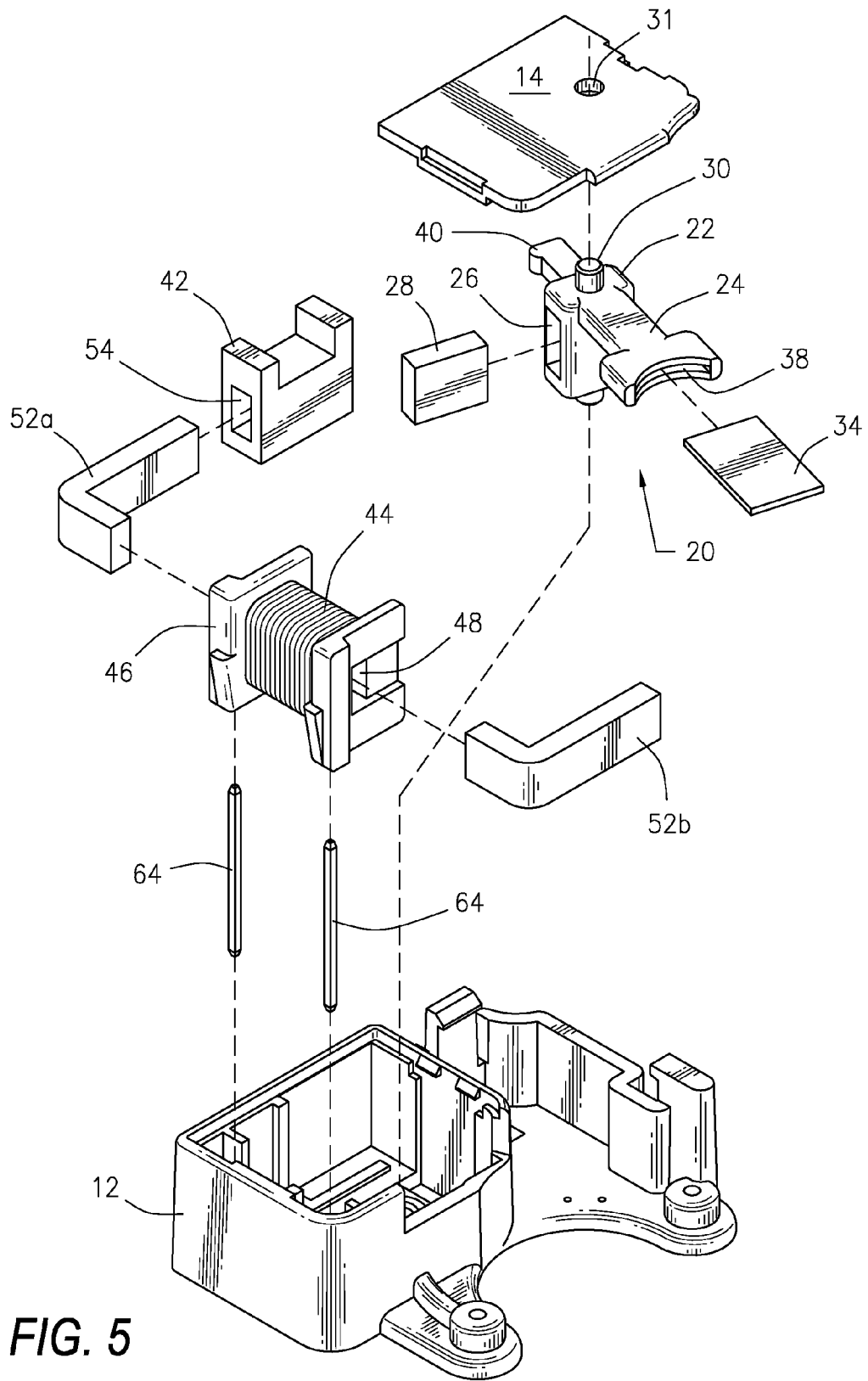
FIG. 5 is an exploded view of the electromechanical device shown in FIG. 4.
Figure 6:
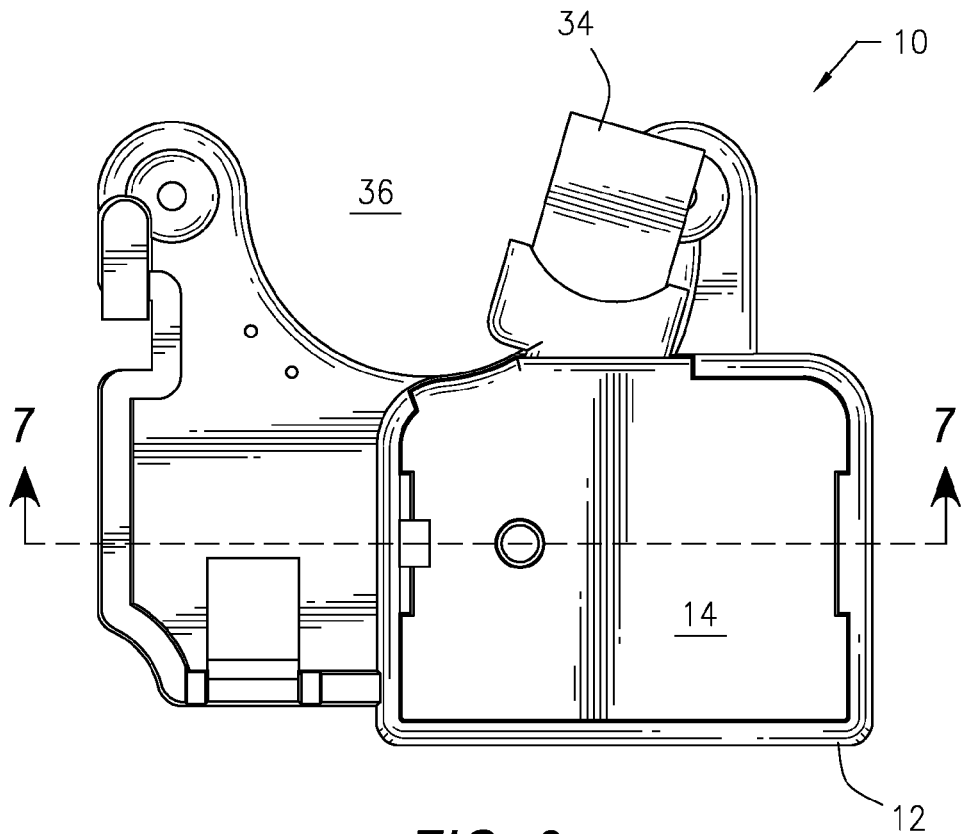
FIG. 6 is a top view of the electromechanical device shown in FIG. 3.
Figure 7:
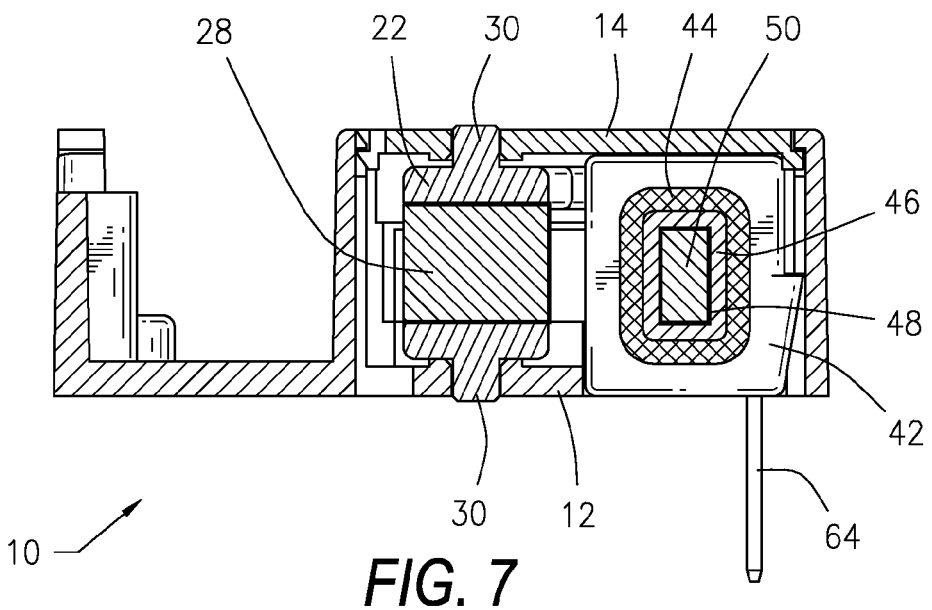
FIG. 7 is a cross-sectional view along line 7-7 of the electromechanical device shown in FIG. 6.
Figure 8:
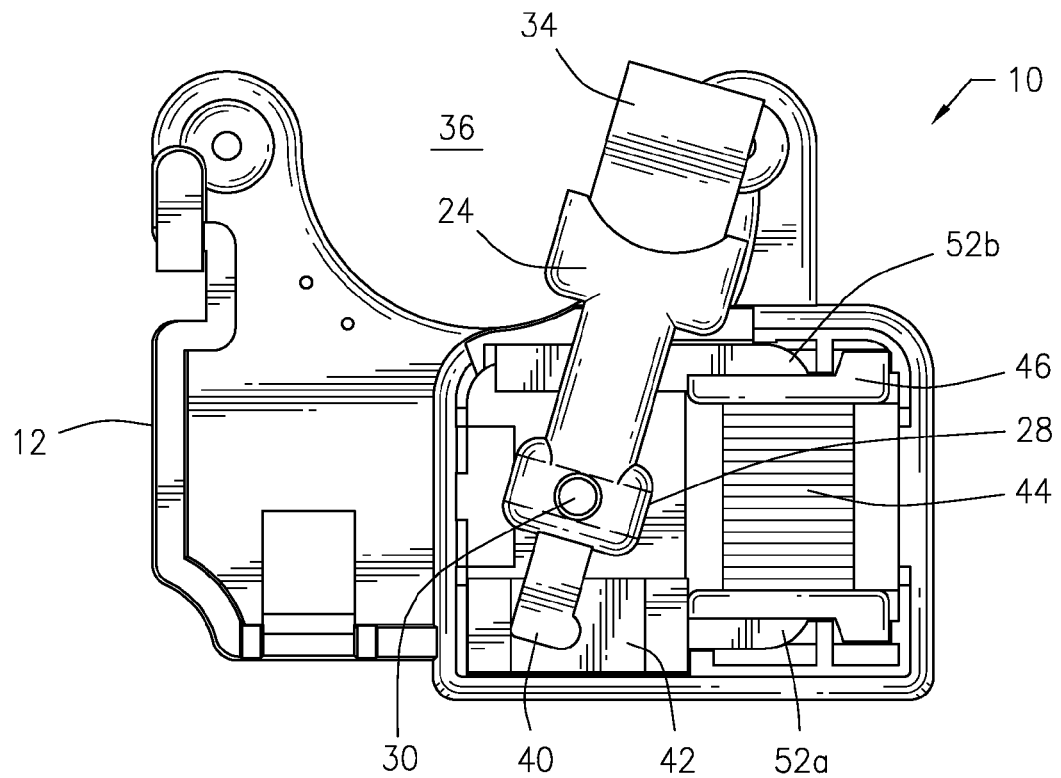
FIG. 8 is a top view of the electromechanical device of FIG. 6 with the housing coverplate removed and an optical lens filter in a first position.
Figure 9:
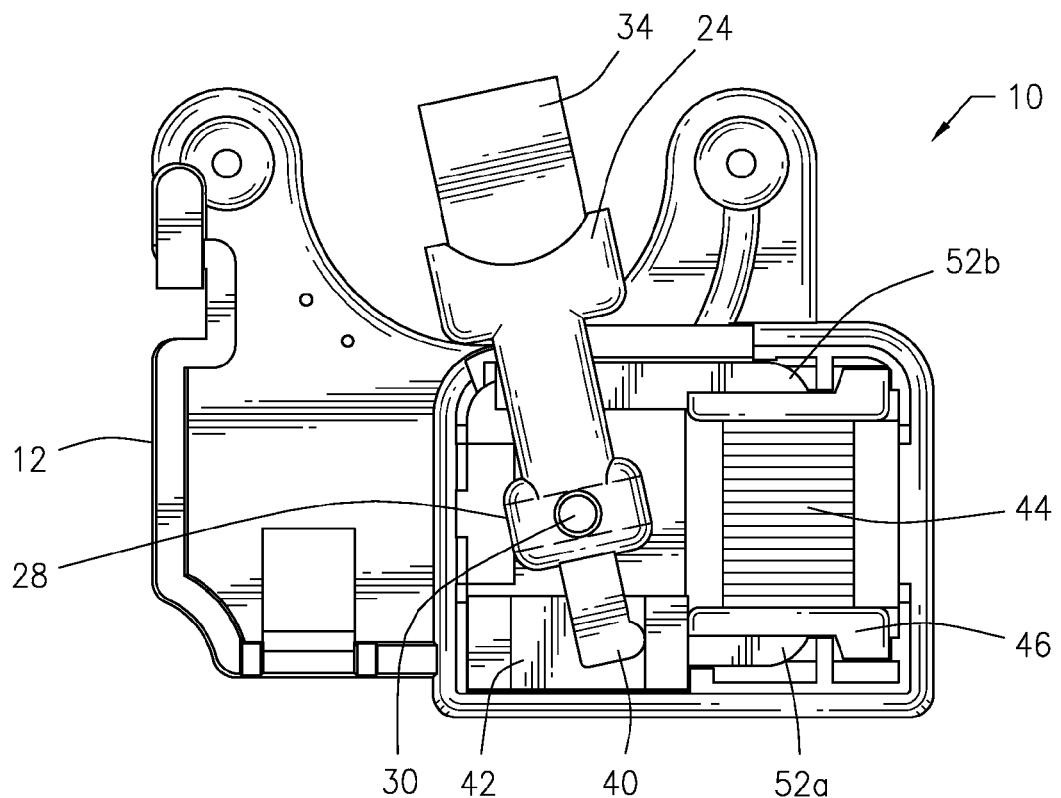
FIG. 9 is a top view of the electromechanical device of FIG. 8 with the optical lens filter in a second position.
Figure 10:
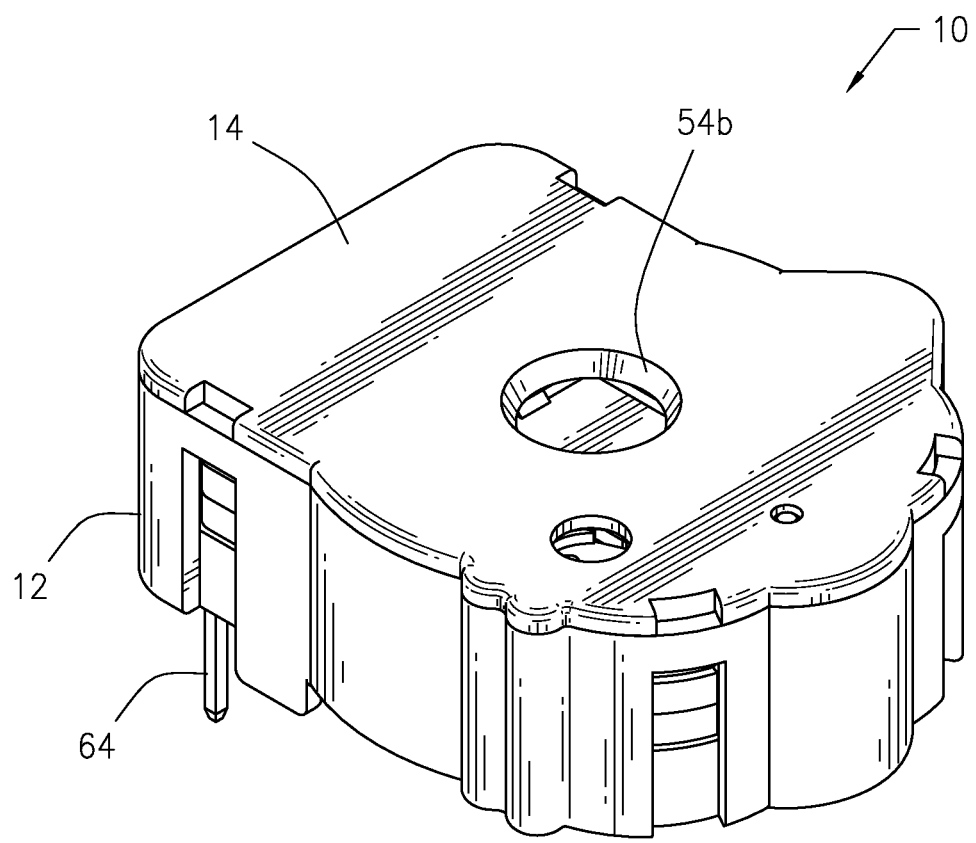
FIG. 10 is a perspective view of an example of the electromechanical device for switching an optical lens filter in a camera in accordance with another illustrative embodiment of the game camera having an electromechanical device for switching an optical lens filter disclosed herein.
Figure 11:
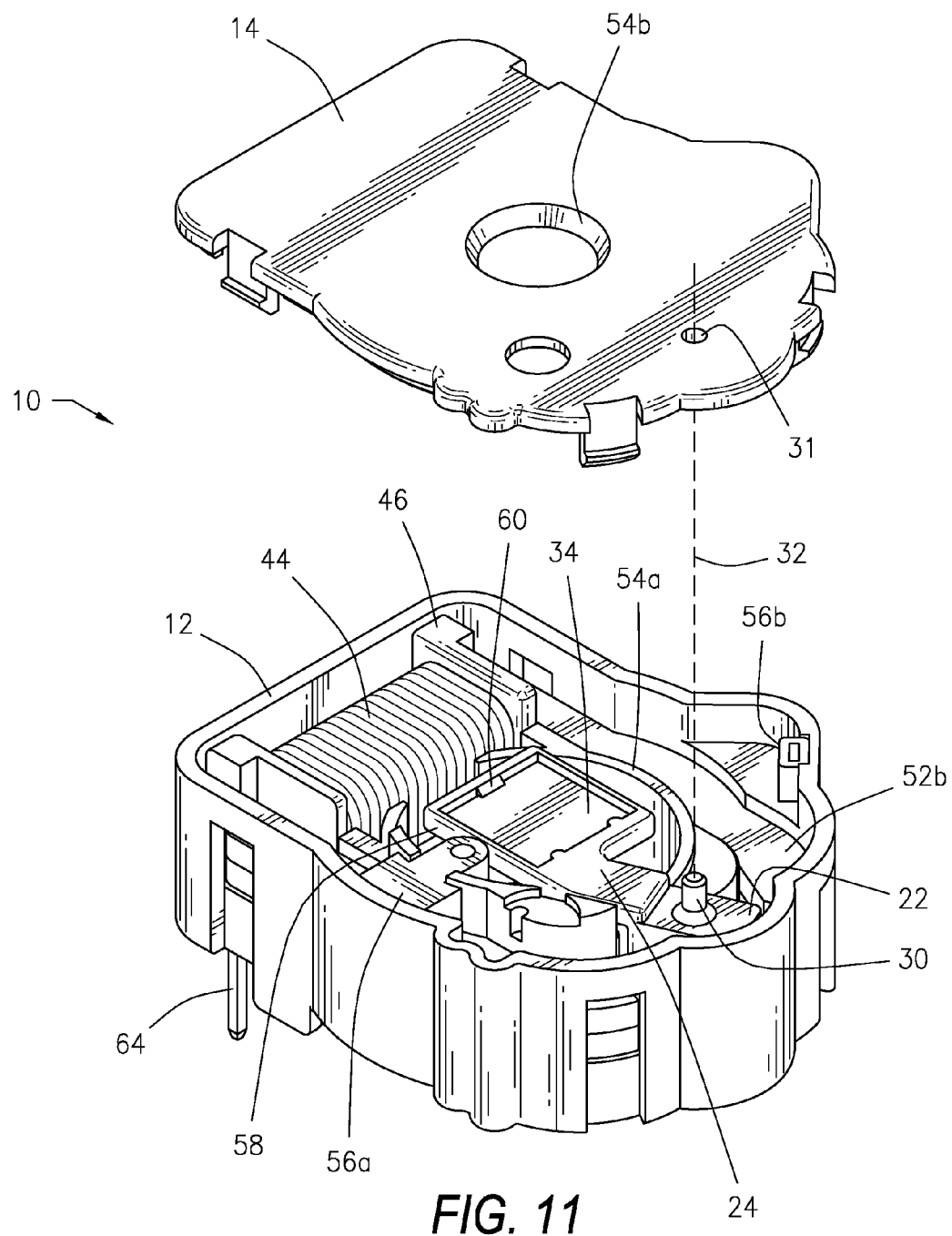
FIG. 11 is a partial exploded view of the electromechanical device shown in FIG. 10.
Figure 12:
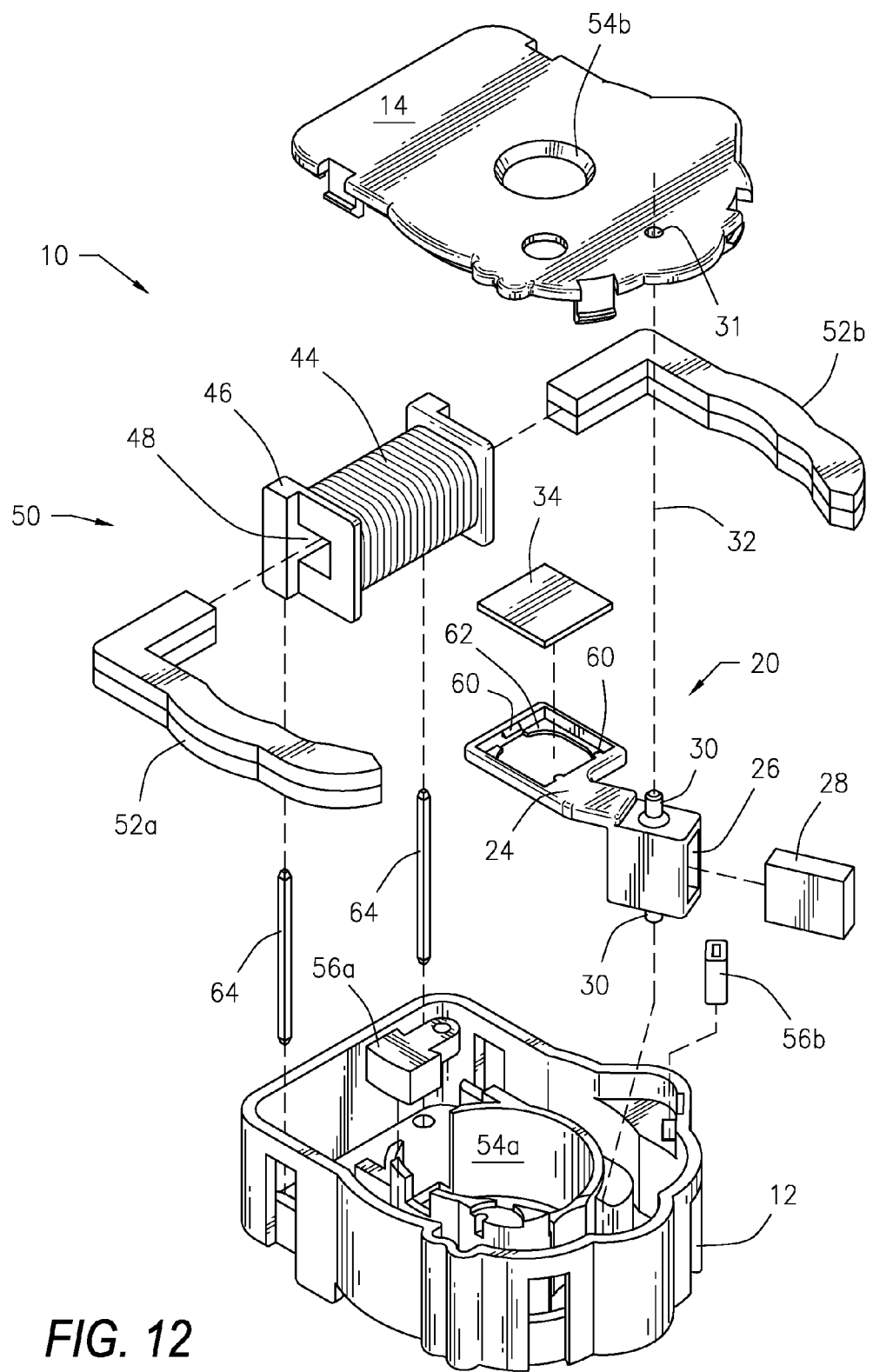
FIG. 12 is an exploded view of the electromechanical device shown in FIG. 11.
Figure 13:
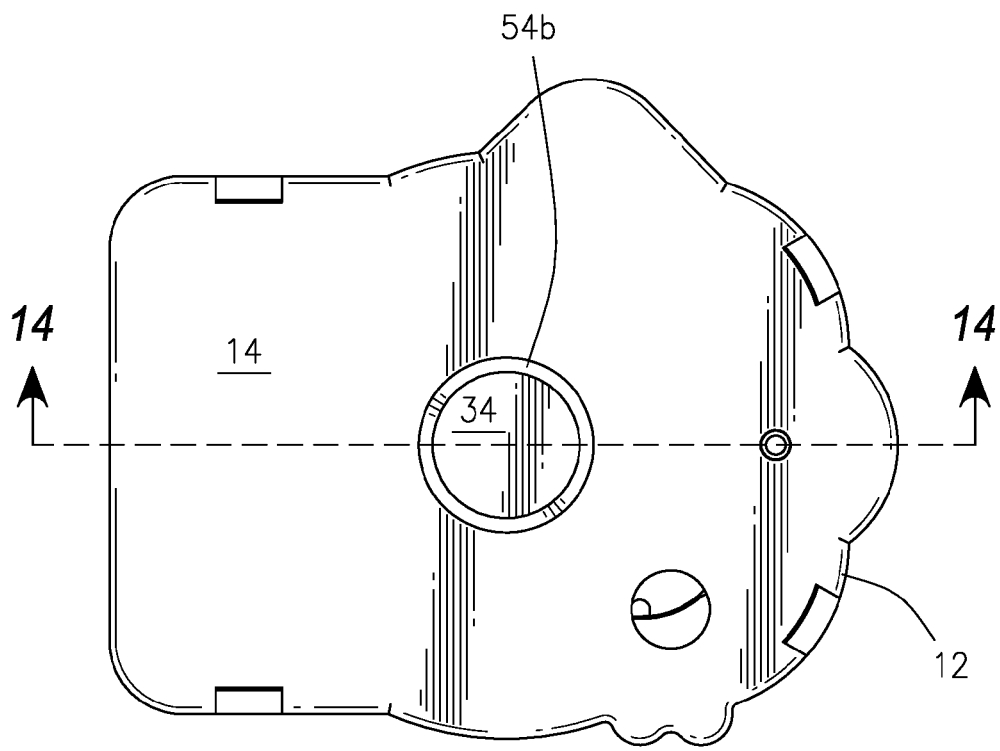
FIG. 13 is a top view of the electromechanical device shown in FIG. 10.
Figure 14:
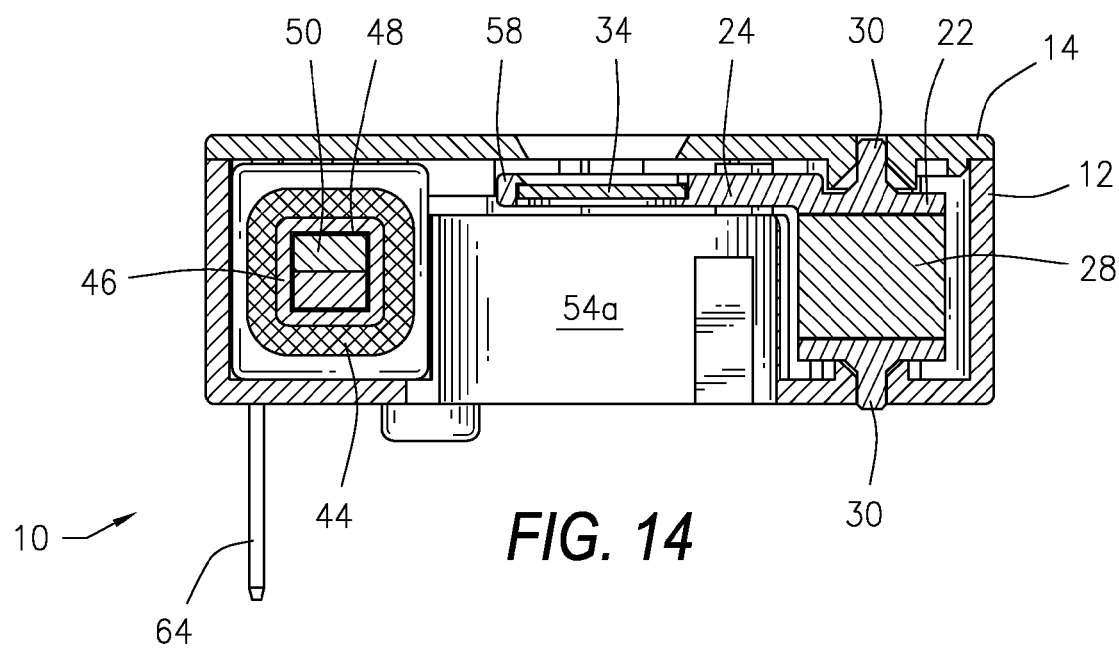
FIG. 14 is a cross-sectional view along line 14-14 of the electromechanical device shown in FIG. 13.

Also enclosed within the device housing 12 is an electromagnet formed by an electromagnetically inductive coil 44 (e.g., a conductive copper wire) wound around a bobbin 46. The bobbin 46 includes an axial channel 48 in substantially perpendicular alignment with the pivot axis 32 formed by the trunnions 30 of the support element 20, and an armature 50 is disposed with the axial channel 48 of the bobbin 46. The armature 50 may be generally U-shaped, constructed from a pair of opposing pole pieces 52a/b composed of highly magnetic material, such as a ferromagnetic metal (e.g., iron) or a ferromagnetic compound (e.g., a ferrite). The pole pieces 52a/b are engaged within and extend out of the axial channel 48 of the bobbin 46 in order to direct the magnetic field produced by the electromagnet towards the magnetic field produced by the permanent magnet 28. The pole pieces 52a/b are generally in parallel alignment along a polar orientation with the permanent magnet 28 enclosed within the support element 20. As illustrated in FIGS. 5, 8 and 9, the pole piece 52a may also be disposed within an axial channel 54 of the stopping element 42. In addition, a pair of substantially parallel coil pins 64 is disposed within a pair of coil pin apertures (not shown) in the bobbin 46 to complete the electromagnet.

During operation when an electric current is provided to the electromechanical device 10, a magnetic field is produced by the coil 44 causing the armature 50 to direct the magnetic field along the length of the pole pieces 52a/b to the poles of the permanent magnet 28 enclosed within the support element 20. For example as shown in FIGS. 8 and 9, when the electromechanical device 10 directs the electrical current to the pole piece 52a, the polarity of the magnetic field at the pole piece 52a opposes the polarity of the magnetic field at one pole of the permanent magnet 28, while the polarity of the magnetic field at the pole piece 52b attracts the polarity of the magnetic field at the other end of the permanent magnet 28, causing the support element 20 to pivot about the axis 32.

When the electric current is reversed thereby reversing the polarity of the magnetic field generated by the electromagnet, the polarity of the magnetic field at the pole pieces 52a/b can be reversed in order to move the cantilevered filter arm 24 from a first position shown in FIG. 8 to a second position shown in FIG. 9. The opposing trunnions 30 of the support element 20 act as the points of rotation for the cantilevered filter arm 24 when moving between the positions illustrated in FIGS. 8 and 9 enabling the optical filter 34 to be selectively inserted into the optical path 36 of the game camera 100 according to the polarity of the magnetic field generated by the electromechanical device 10. The limiting arm 40 of the support element 20 and the stopping element 42 limits the movement of the cantilevered filter arm 24 when moving between the positions illustrated in FIG. 8 and FIG. 9.

Referring now to FIGS. 10 through 16 illustrating an alternative structural embodiment of the claimed invention, the electromechanical device 10 is enclosed within the device housing 12 using the housing coverplate 14. The device housing 12 and the housing coverplate 14 each have an optical path aperture 54a/b axially aligned along the optical path 36 of the game camera 100. The support element 20 is pivotally secured to the device housing 12 and the aperture 31 in the coverplate 14 using the opposing trunnions 30 projecting from the main body 22. Similar to above, the main body 22 has the magnetic field source, e.g., the permanent magnet 28, retained within the cavity 26. The cantilevered filter arm 24 has the optical lens filter 34 that is selectively inserted into the optical path 36 of the camera 100. As illustrated in this example, the filter arm 24 is disposed within the device housing 12 and, when moved into position, overhangs the optical lens filter 34 into the optical path apertures 54a/b of the device housing 12 and the coverplate 14, into the optical path 36 of the camera 100. The optical lens filter 34 may be removably secured to the filter arm 24 along an outer periphery 58 of the filter 34 sandwiched between tabs 60 and a shoulder 62.

Similar to the example structural embodiment discussed above, the electromechanical device 10 is constructed of the electromagnetically inductive coil 44 wound around the bobbin 46 to form the electromagnet. The generally U-shaped armature 50 is constructed about the optical path aperture 54a in the device housing 12 from opposing pole pieces 52a/b. One end of each of the pole pieces 52a/b is disposed within the axial channel 48 of the bobbin 46. The axial channel 48 is substantially perpendicular to the pivot axis 32 formed by the trunnions 30 of the support element 20, and the pole pieces 52a/b extend out of the axial channel 48 of the bobbin 46 directing the electromagnetic field towards the permanent magnet 28 retained in the main body 22 of the support element 20.

Figure 15:
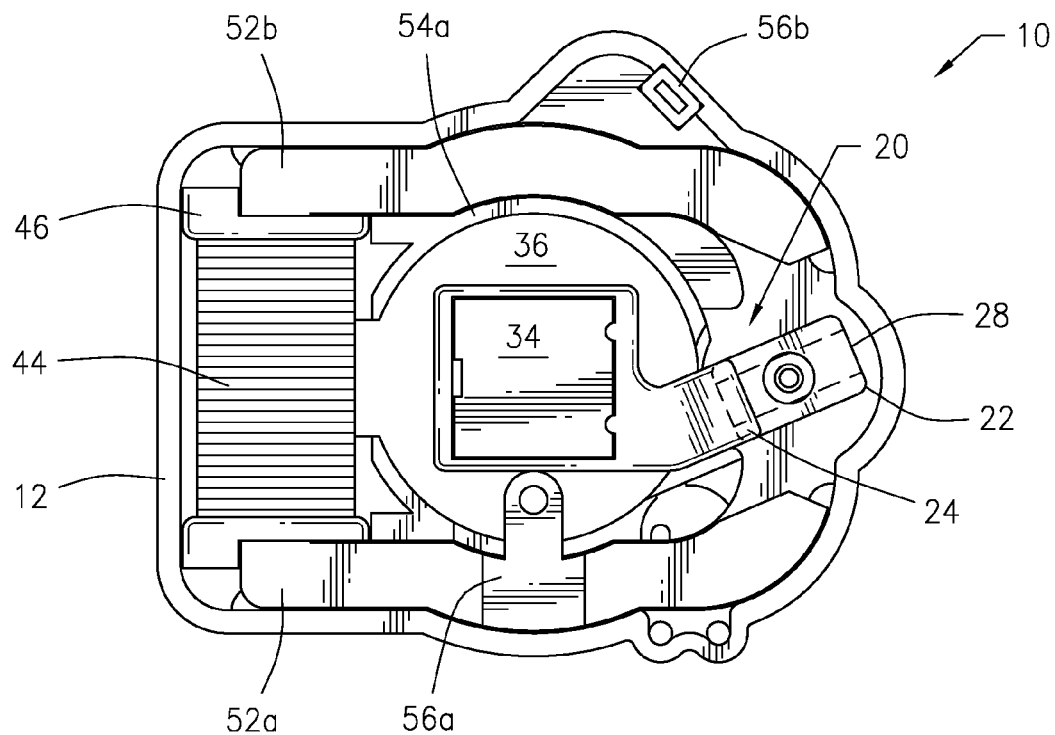
FIG. 15 is a top view of the electromechanical device of FIG. 13 with the housing coverplate removed and an optical lens filter in a first position.
Figure 16:
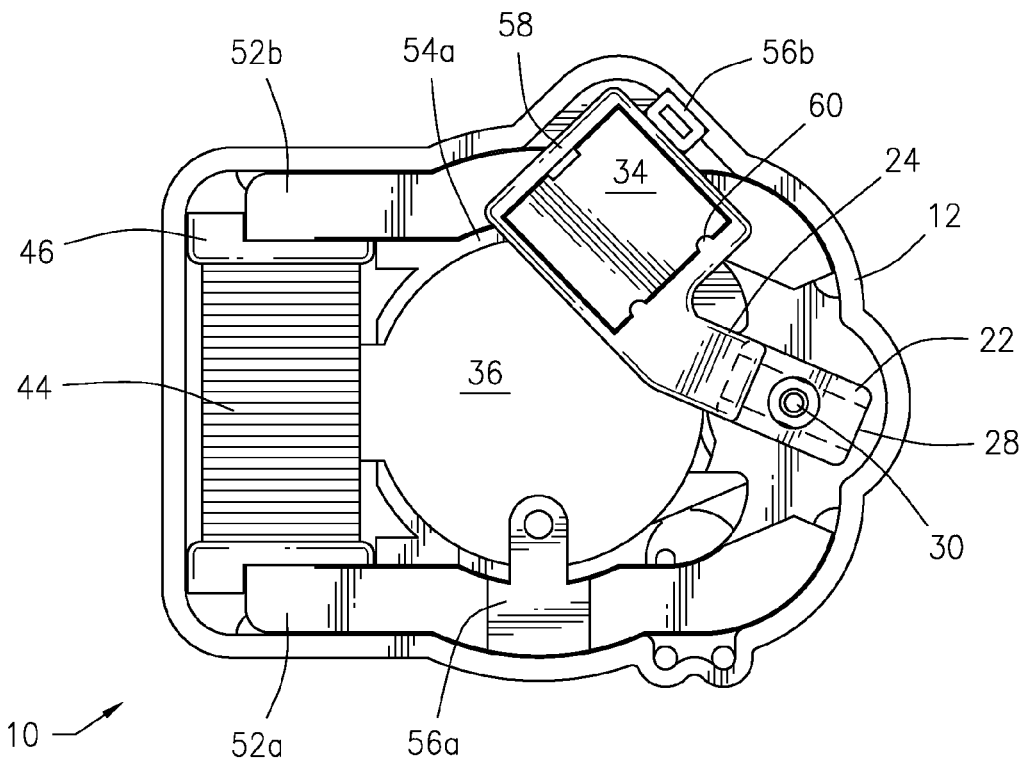
FIG. 16 is a top view of the electromechanical device of FIG. 15 with the optical lens filter in a second position.
Figure 17:
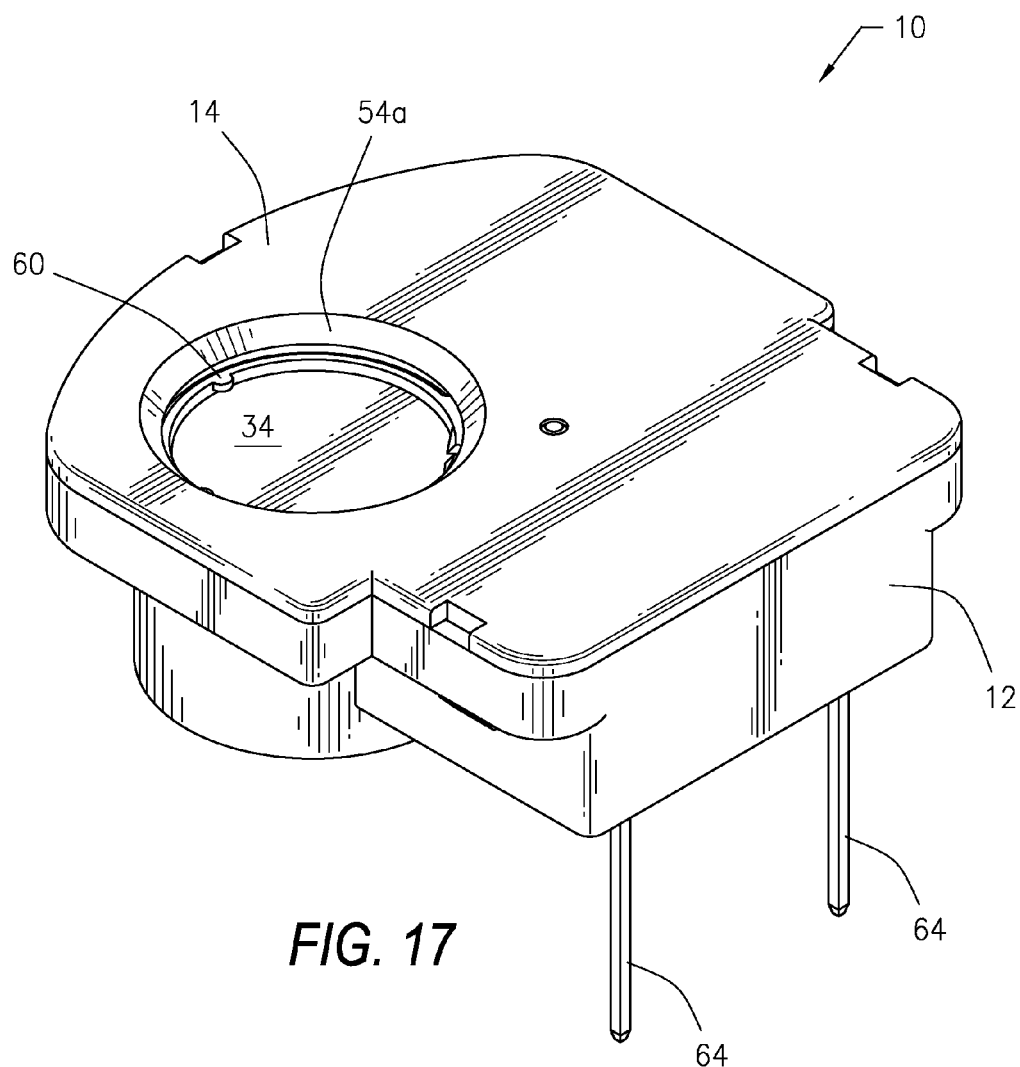
FIG. 17 is a perspective view of an example of an electromechanical device for switching an optical lens filter in a camera in accordance with yet another illustrative embodiment of the game camera having an electromechanical device for switching an optical lens filter disclosed herein.
Figure 18:
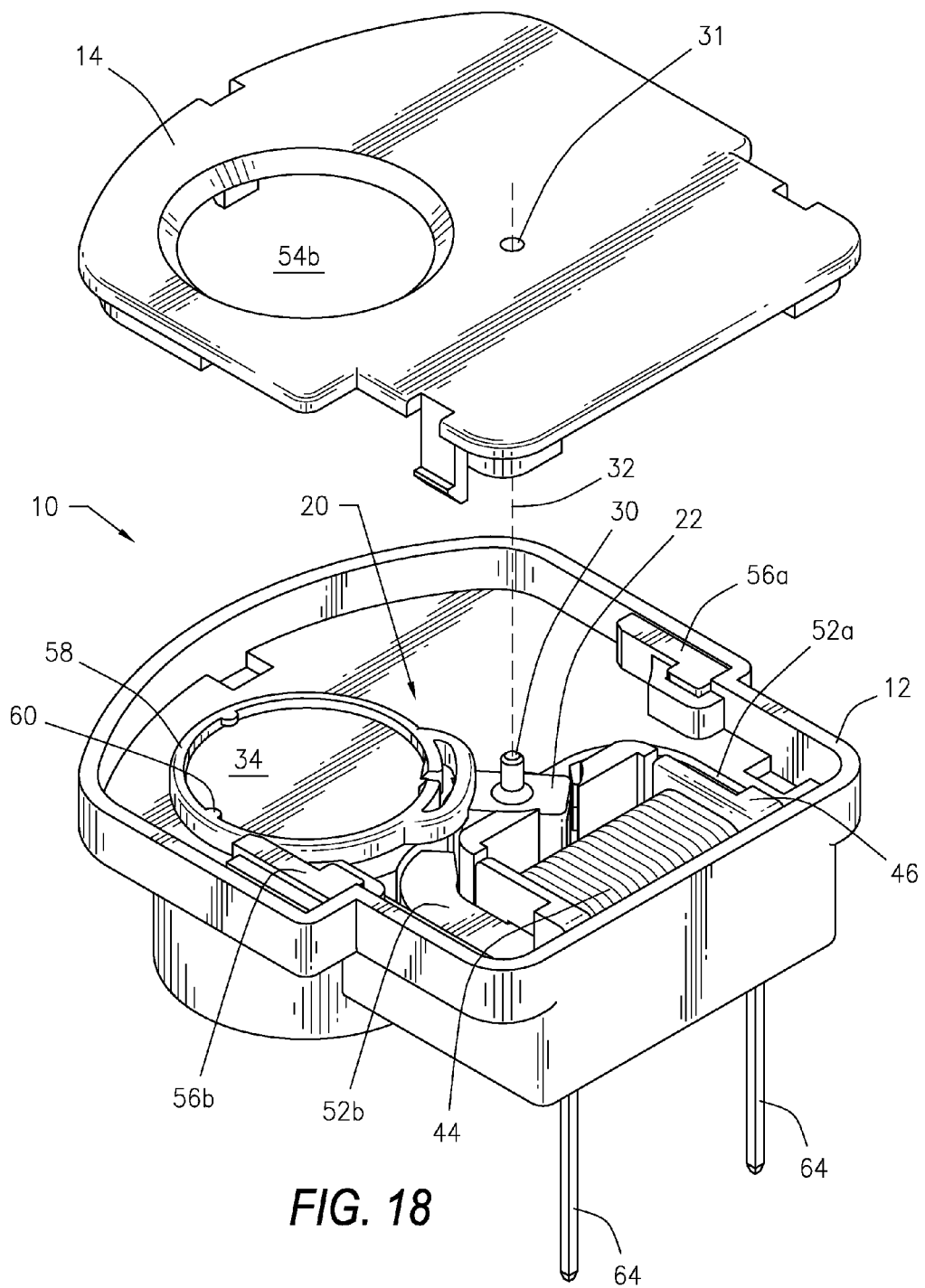
FIG. 18 is a partial exploded view of the electromechanical device shown in FIG. 17.
Figure 19:
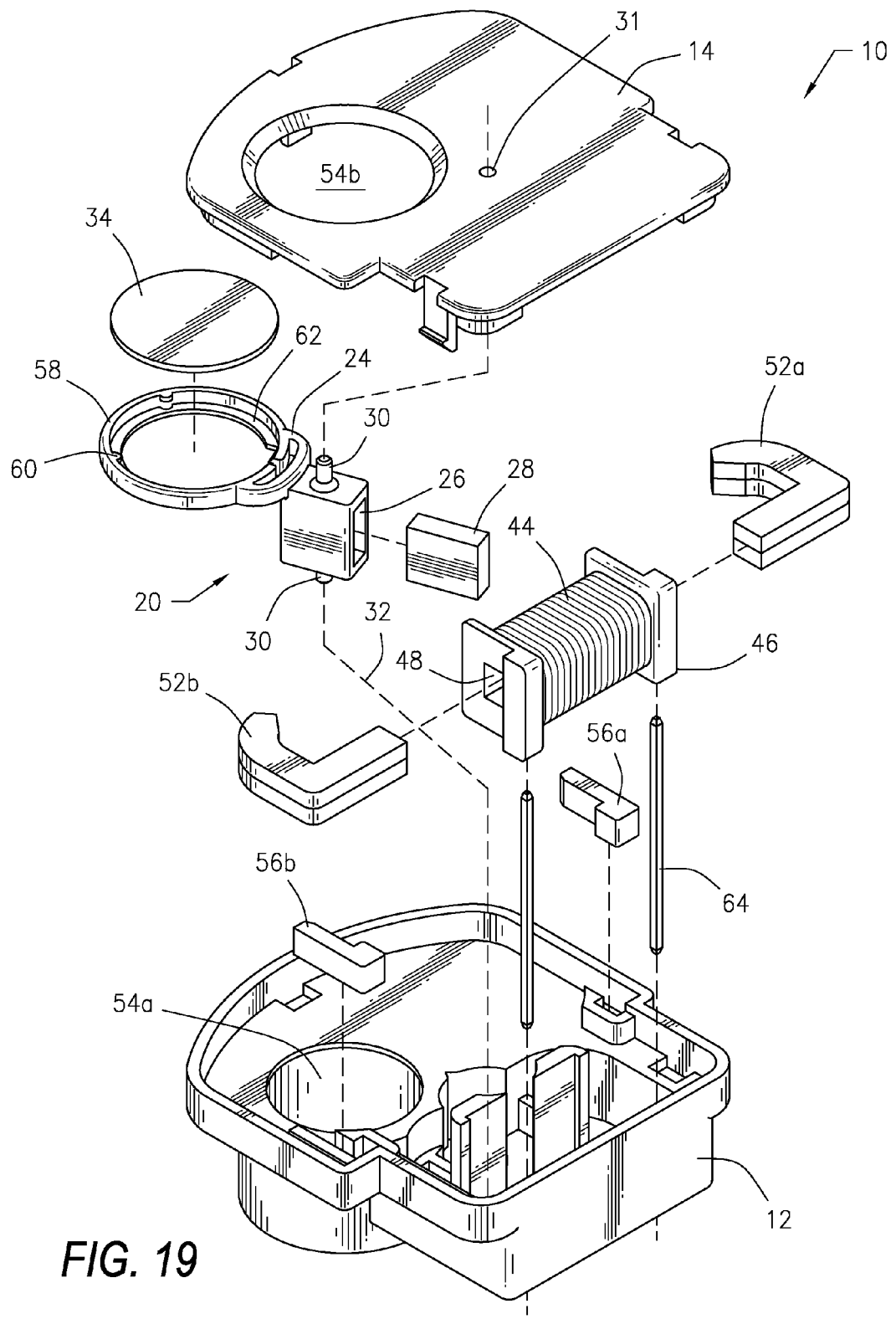
FIG. 19 is an exploded view of the electromechanical device shown in FIG. 18.
Figure 20:
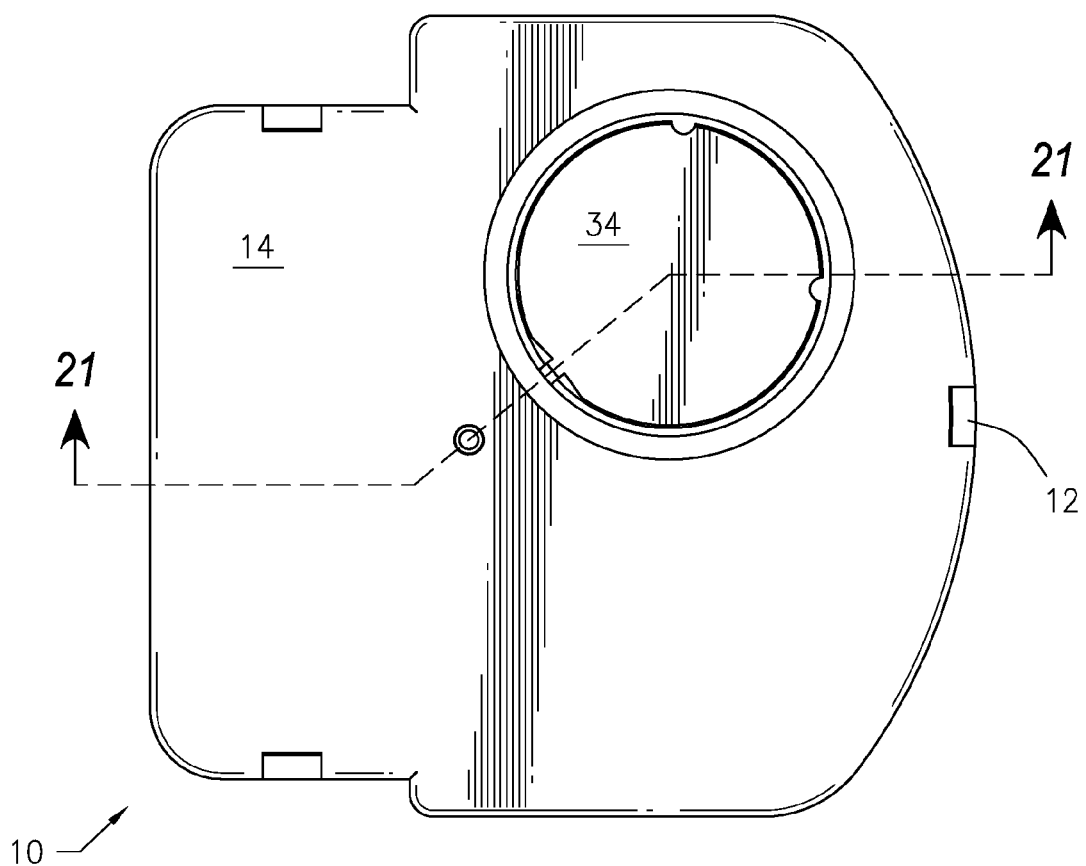
FIG. 20 is a top view of the electromechanical device shown in FIG. 17.
Figure 21:
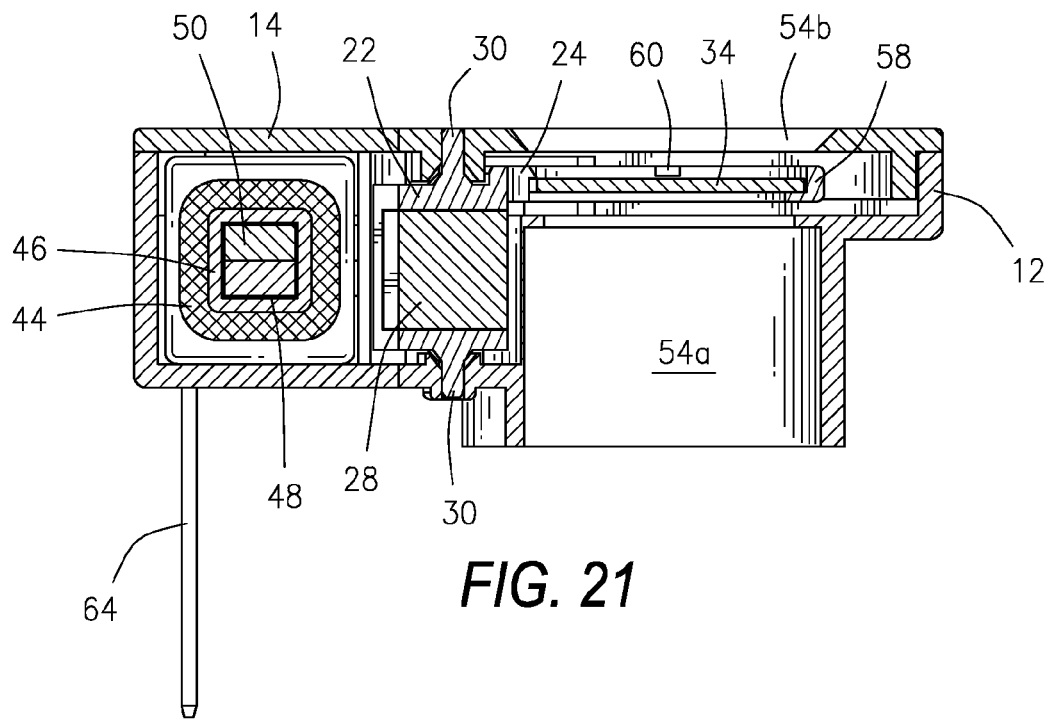
FIG. 21 is a cross-sectional view along line 21-21 of the electromechanical device shown in FIG. 20.
Figure 24:
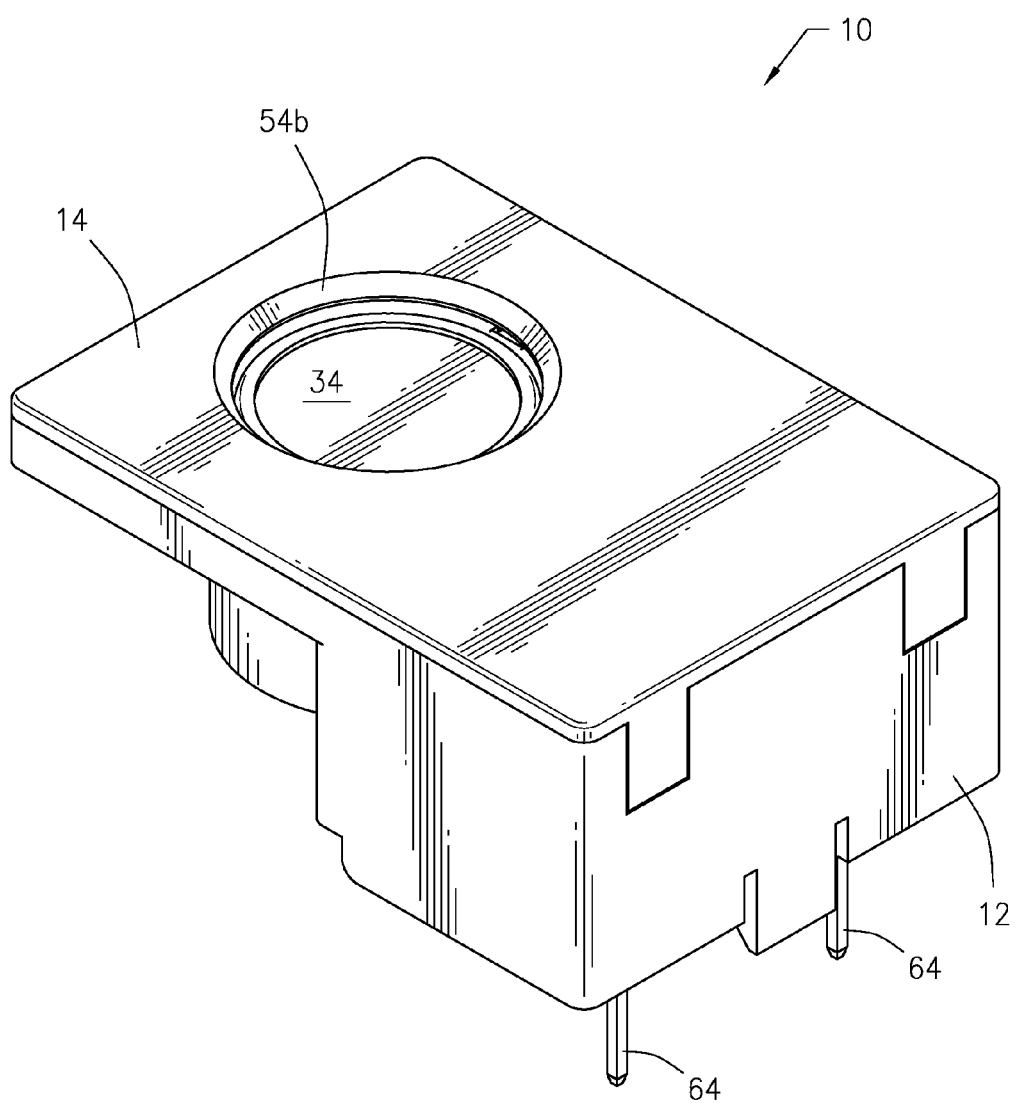
FIG. 24 is a perspective view of an example of an electromechanical device for switching an optical lens filter in a camera in accordance with yet another illustrative embodiment of the game camera having an electromechanical device for switching an optical lens filter disclosed herein.
Figure 25:
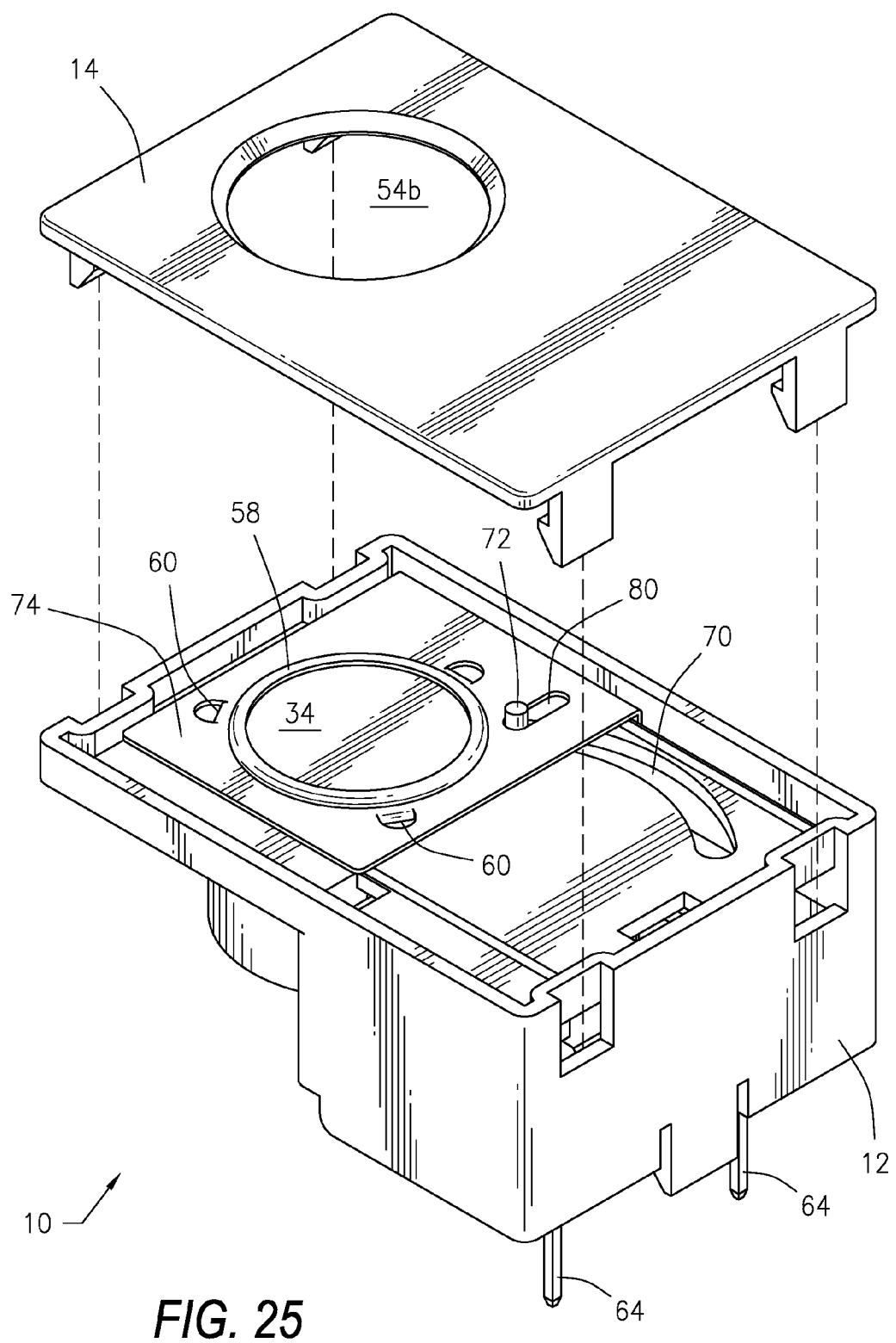
FIG. 25 is a partial exploded view of the electromechanical device shown in FIG. 24.
Figure 26:
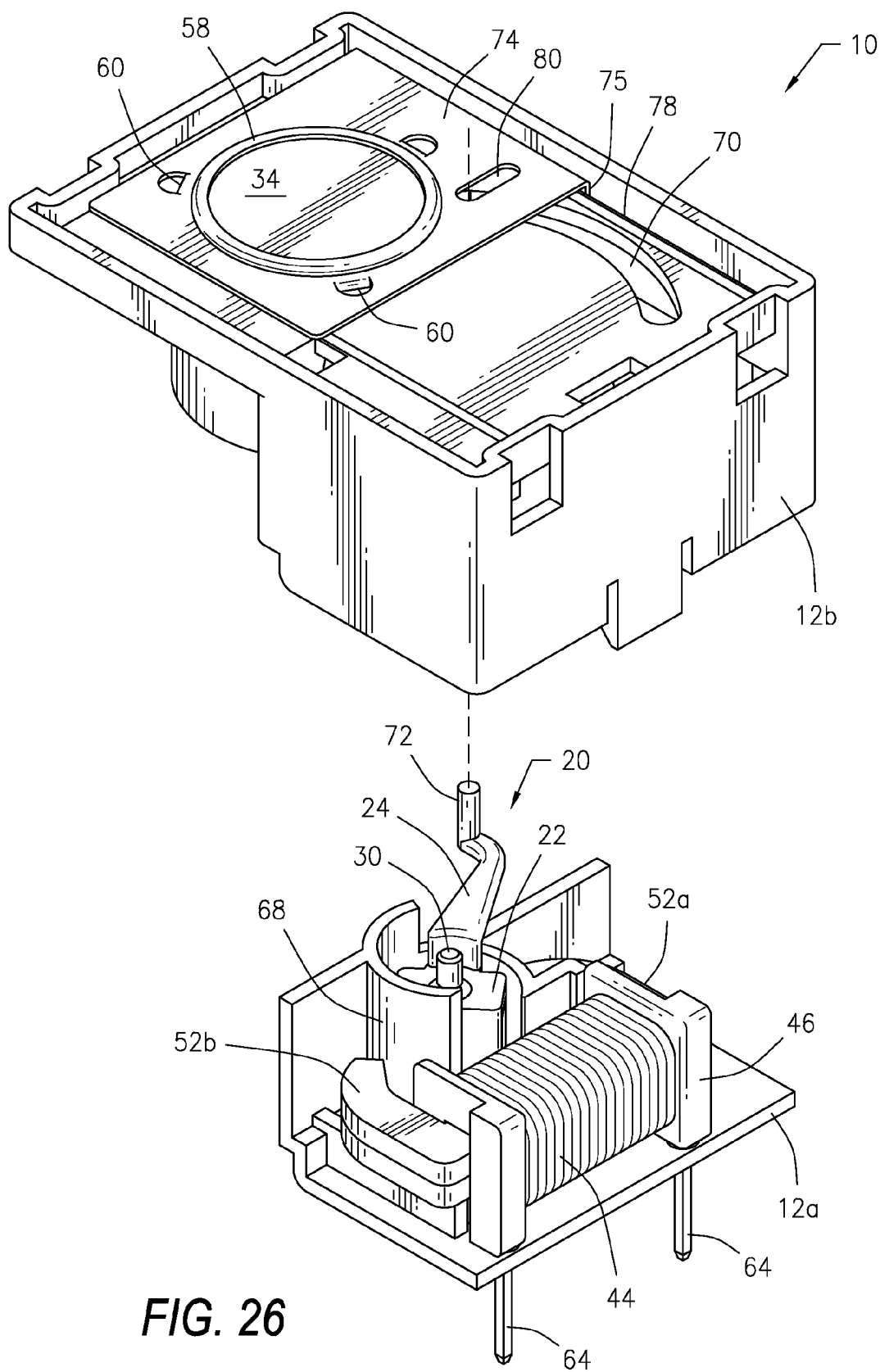
FIG. 26 is another partial exploded view of the electromechanical device shown in FIG. 24.
Figure 27:
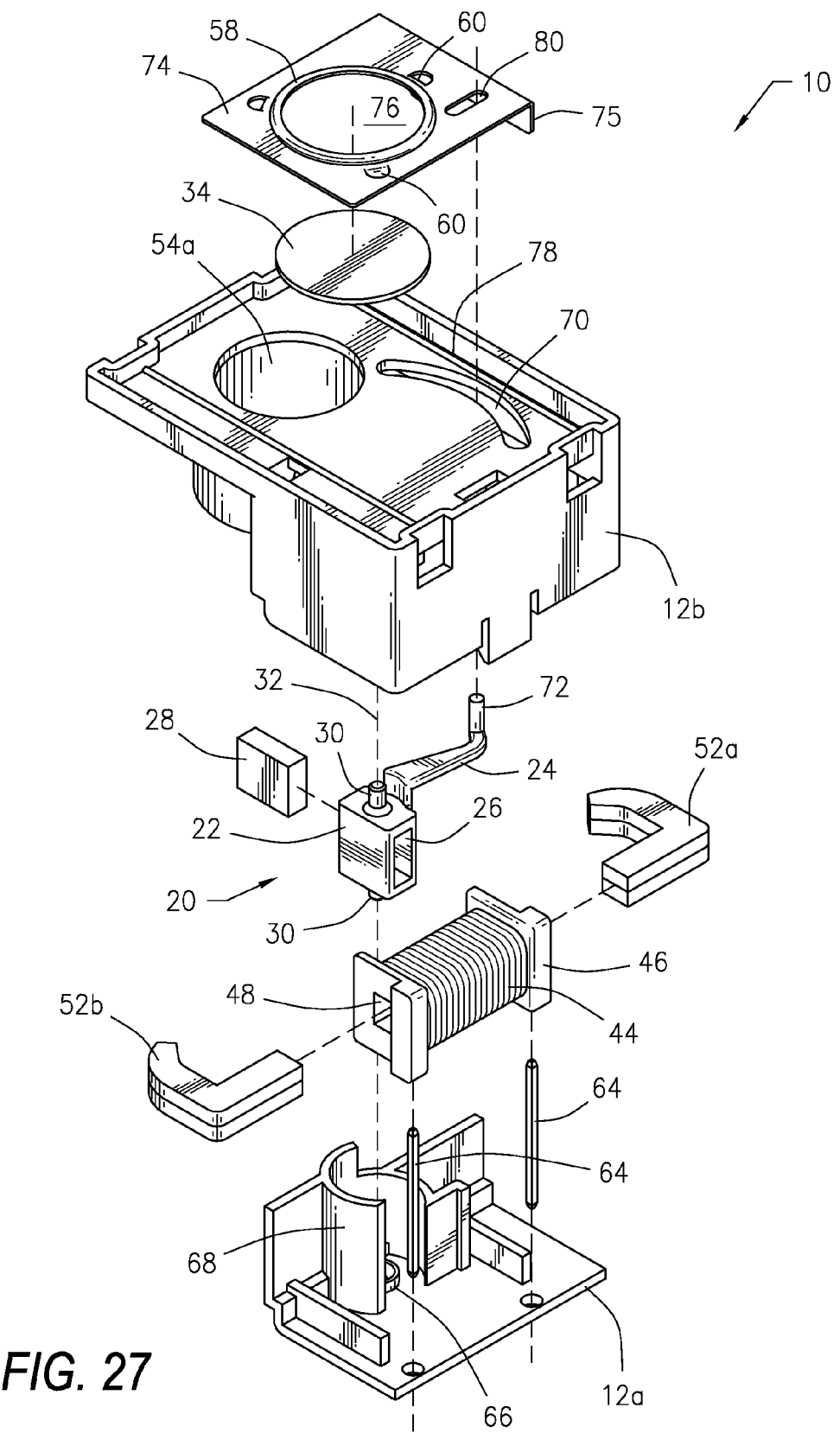
FIG. 27 is an exploded view of the electromechanical device shown in FIG. 26.
Figure 28:
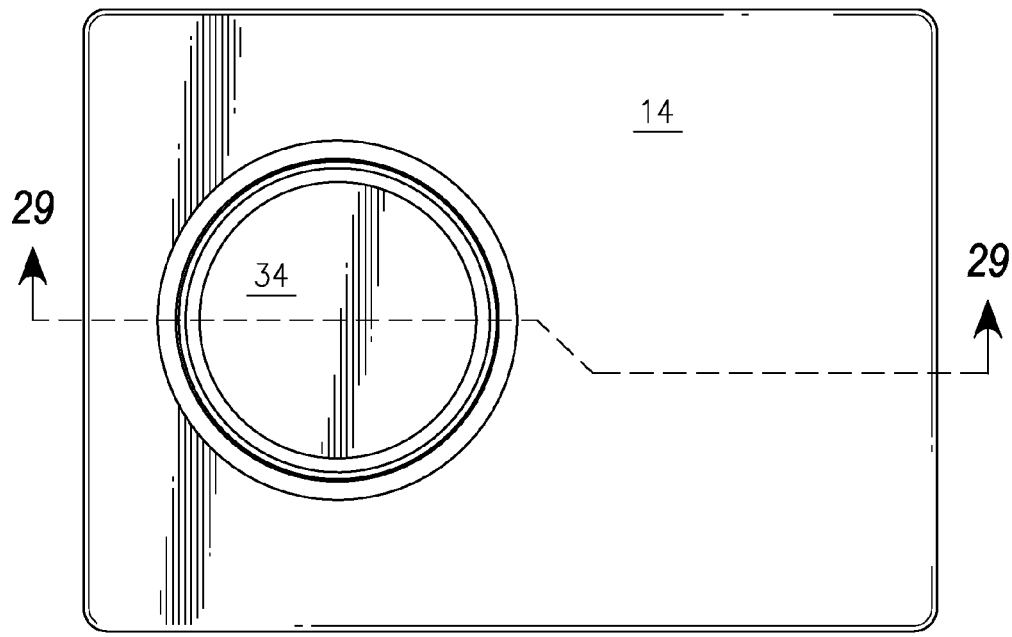
FIG. 28 is a top view of the electromechanical device shown in FIG. 24.
Figure 29:
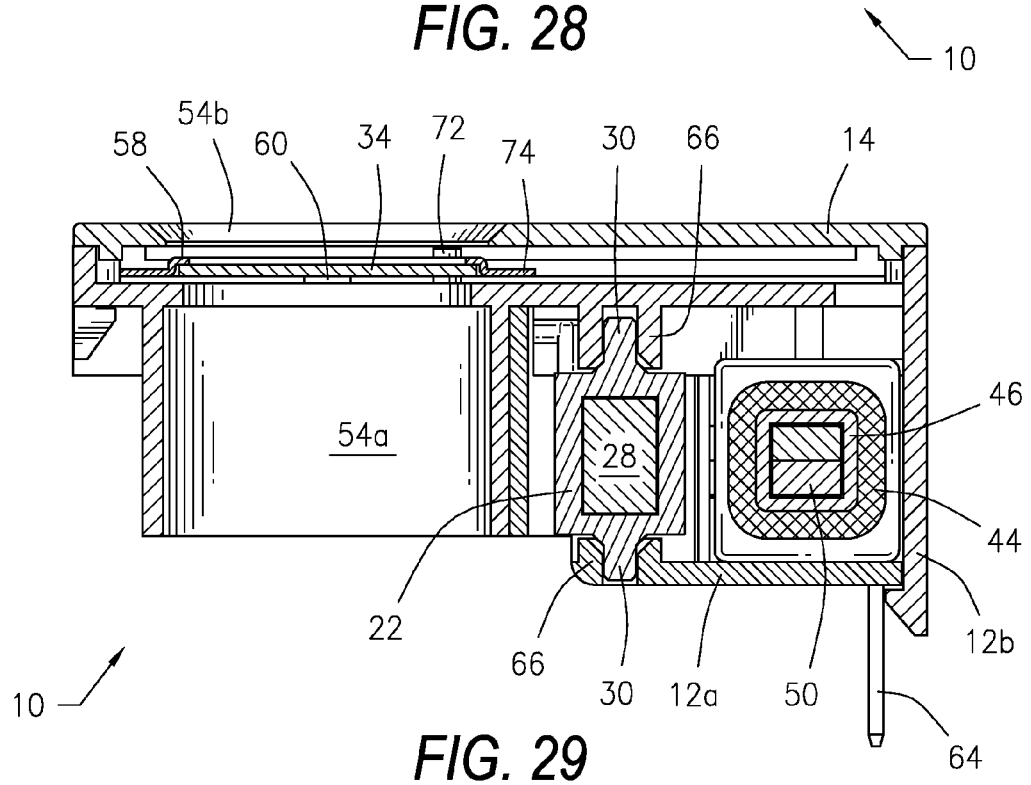
FIG. 29 is a cross-sectional view along line 29-29 of the electromechanical device shown in FIG. 28.

As illustrated in FIGS. 15 and 16, according to the polarity of the magnetic field generated by the electromechanical device 10 along the length of the pole pieces 52a/b to a pole of the permanent magnet 28 disposed within the support element 20, the support element 20 rotates about the trunnions 30 along the pivot axis 32, thereby moving the cantilevered filter arm 24 from the first position shown in FIG. 15 to the second position shown in FIG. 16. In lieu of the projecting limiting arm 40 engaged with the generally U-shaped stopping element 42 discussed above, a pair of stopping elements 56a/b disposed at opposing sides of the device housing 12 limit the movement of the support element 20. When the first position illustrated in FIG. 15 is reached, the outer periphery 58 of the cantilevered filter arm 24 engages the stopping element 56a halting the rotation of the support element 20. When the polarity of the magnetic field generated by the coil 44 of the electromagnet is reversed, the support element 20 pivots about the trunnions 30 moving the filter arm 24 into the second position illustrated in FIG. 16 where the opposing side of the outer periphery 58 of the cantilevered filter arm 24 contacts the stopping element 56b. In this position, the optical lens filter 34 is no longer aligned with the optical path 36 of the camera 100.

Turning now to FIGS. 17 through 23 illustrating yet another structural embodiment, the electromechanical device 10 again utilizes electric current from the electromagnet to selectively move the optical lens filter 34 into and out of the optical path 36 of the camera 100. The coil 44, the bobbin 46 and the armature 50 are disposed within the device housing 12 and enclosed with the housing coverplate 14. Similar to the structural embodiment of the electromechanical device 10 illustrated in FIGS. 10 through 16, the device housing 12 and the housing coverplate exemplified in FIGS. 17 through 23 each has an optical path aperture 54a/b axially aligned along the optical path 36 of the game camera 100. Trunnions 30 pivotally secure the support element 20 between the device housing 12 and the aperture 31 in the coverplate 14. The main body 22 includes the cavity 26 retaining the magnetic field source, e.g., the permanent magnet 28. The cantilevered filter arm 24 has the optical lens filter 34 that is selectively inserted into the optical path 36 of the camera 100. The optical lens filter 34 is removably secured to the filter arm 24 along an outer periphery 58 of the filter 34 sandwiched between tabs 60 and a shoulder 62.

When an electric current is generated by the electromagnet, the cantilevered filter arm 24 moves from the position illustrated in FIG. 22 to the position illustrated in FIG. 23. By controlling the polarity of the magnetic field generated along the pole pieces 52a/b directed to the permanent magnet 28, the support element 20 selectively pivots about axis 32 moving the optical lens filter 34 into the optical path 36 of the camera 100 as shown in FIG. 22 or to the position shown in FIG. 23 where the optical lens filter 34 is not in the optical path 36 of the camera 100. When the position illustrated in FIG. 22 is reached, the outer periphery 58 of the cantilevered filter arm 24 contacts the stopping element 56a, and when the electric current is reversed, the support element 20 pivots about the trunnions 30 moving the filter arm 24 into the position illustrated in FIG. 23 where the opposing side of the outer periphery 58 of the cantilevered filter arm 24 contacts the stopping element 56b preventing further movement of the support element 20 in that direction.

Turning now to FIGS. 24 through 31 illustrating still yet another structural embodiment, the electromechanical device 10 again utilizes electric current from the electromagnet to selectively move the optical lens filter 34 into and out of the optical path 36 of the camera 100. In this example, the coil 44, the bobbin 46 and the armature 50 are disposed within a two-part device housing 12 having a first housing part 12a and a second housing part 12b. The housing coverplate 14 is removably securable to the second housing part 12b, and the first housing part 12a is removably connected to the second housing part 12b. Further, each of the first housing part 12a and the second housing part 12b includes a trunnion support 66 rotatably coupled with the trunnions 30 of the support element 20. The first housing part 12a also may include a receptacle 68 with the support element 20 disposed therein. The second housing part 12b and the housing coverplate 14 each has an optical path aperture 54a/b axially aligned along the optical path 36 of the game camera 100. In addition, the second housing part 12b includes an arcuate channel 70.

In this embodiment, the main body 22 includes the cavity 26 retaining the magnetic field source, e.g., the permanent magnet 28. The cantilevered filter arm 24 includes an elongated, protruding shaft 72, which is disposed within the arcuate channel 70 of the second housing part 12b. The shaft 72 of the filter arm 24 is engaged with the optical lens filter 34 that is selectively inserted into the optical path 36 of the camera 100. The optical lens filter 34 is retained by a filter bracket 74 that is slidably joined to the second housing part 12b. As exemplified, the filter bracket 74 has an optical path aperture 76, with the optical lens filter 34 is removably secured to along an outer periphery 58 of the filter 34 sandwiched between tabs 60. The filter bracket 74 also includes an overturned side 75 engaged within a linear channel 78 of the second housing part 12b, along with a shaft aperture 80 that is engaged with the shaft 72 of the filter arm 24.

When an electric current is generated by the electromagnet, the filter arm 24 rotates from the position illustrated in FIG.

Figure 30:
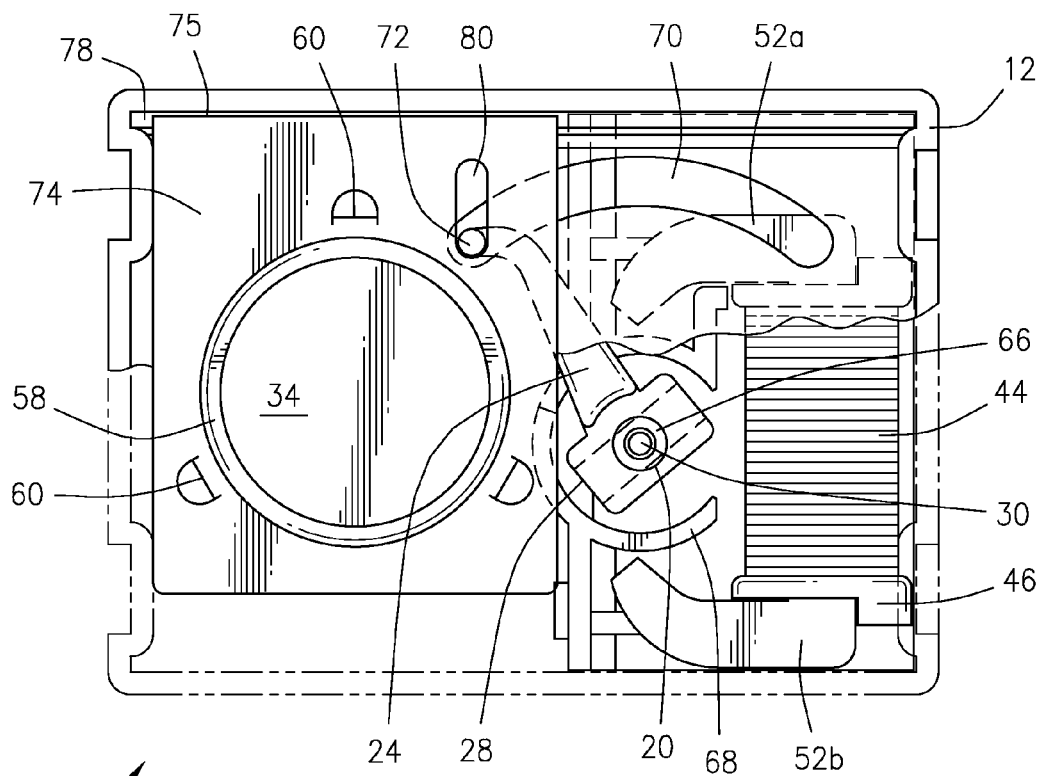
FIG. 30 is a top view of the electromechanical device of FIG. 28 with the housing coverplate removed and an optical lens filter in a first position.
Figure 31:
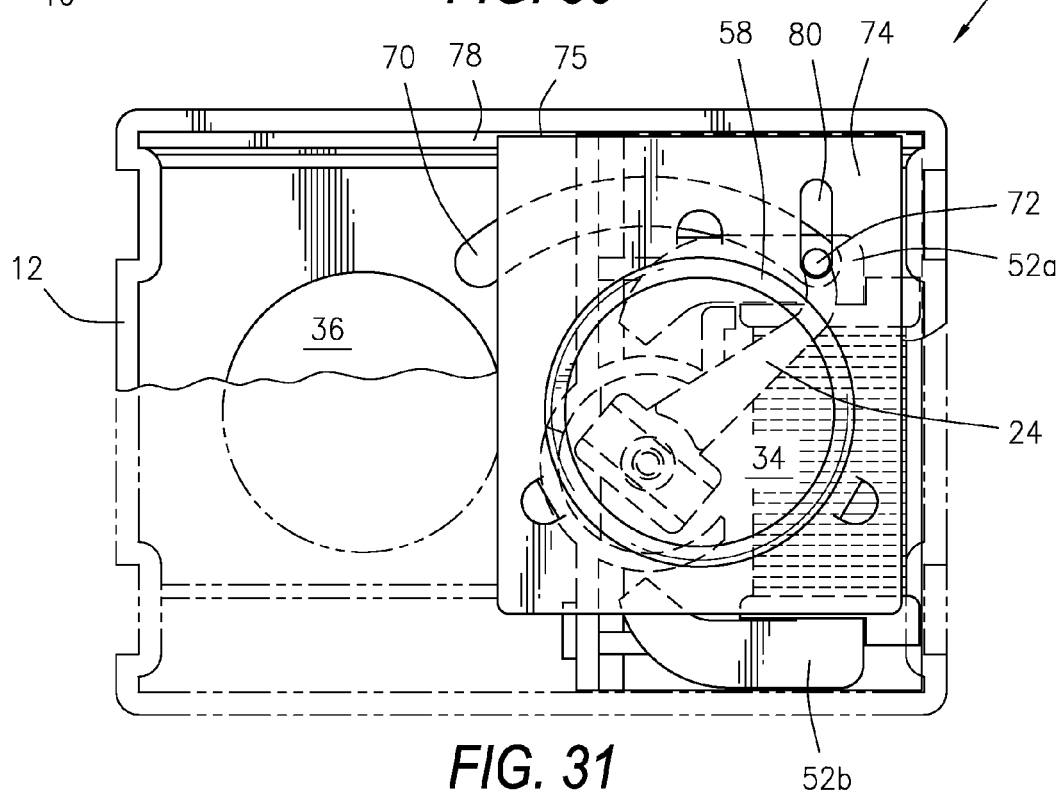
FIG. 31 is a top view of the electromechanical device of FIG. 30 with the optical lens filter in a second position.

30 to the position illustrated in FIG. 31. By controlling the polarity of the magnetic field generated along the pole pieces 52a/b directed to the permanent magnet 28, the support element 20 selectively pivots about axis 32. When the support element 20 pivots, the shaft 72 of the filter arm 24 engages the shaft aperture 80 causing the filter bracket 74 to slide within the second housing part 12b, thereby moving the optical lens filter 34 into the optical path 36 of the camera 100 as shown in FIG. 30 or to the position shown in FIG. 31 where the optical lens filter 34 is not in the optical path 36 of the camera 100. When the position illustrated in FIG. 30 is reached, the shaft 72 of the filter arm 24 contacts a terminal end of the arcuate channel 70, and when the electric current is reversed, the support element 20 pivots about the trunnions 30 moving the filter arm 24 into the position illustrated in FIG. 31 where the shaft 74 contacts the opposing terminal end of the arcuate channel 70 preventing further movement of the support element 20 in that direction.

Whereas, the devices and methods have been described in relation to the drawings and claims, it should be understood that other and further modifications, apart from those shown or suggested herein, may be made within the spirit and scope of this invention.

What is claimed is:

1. A digital game scouting camera, comprising:
    a digital camera for taking an image, said camera enclosed in a camera housing;
    an electromechanical device comprising a primary magnet and a support element having a secondary magnet, and said support element pivotally secured to said electromechanical device about a pivot axis; and
    an optical lens filter;
    wherein said primary magnet opposes said secondary magnet to pivot said support element about said pivot axis to selectively insert said optical lens filter into an optical path of said camera.

2. The camera of claim 1 wherein said camera housing is weatherproof and constructed from an impact resistant plastic.

3. The camera of claim 1 wherein said camera housing further comprises a main body and a removable cover.

4. The camera of claim 1 wherein said primary magnet is an electromagnet comprising an electromagnetically inductive coil wound around a bobbin, said bobbin having an axial channel with an armature disposed therein.

5. The camera of claim 4 wherein said axial channel of said bobbin is substantially perpendicular to said pivot axis of said support element.

6. The camera of claim 4 wherein said armature further comprises a pair of pole pieces directing the magnetic field generated by said electromagnet towards said secondary magnet.

7. The camera of claim 6 wherein said secondary magnet is a permanent magnet.

8. The camera of claim 7 wherein said pole pieces are aligned generally parallel with the axis passing through the magnetic poles of said permanent magnet.

9. The camera of claim 4 wherein said armature is constructed of a ferromagnetic metal or a ferromagnetic compound.

10. The camera of claim 1 wherein said support element further comprises a body having opposing trunnions rotatably engaged with said electromechanical device, and said support element further comprises a cantilevered filter arm.

11. The camera of claim 10 wherein said opposing trunnions are axially spaced and coaxially aligned along said pivot axis.

12. The camera of claim 10 wherein said filter arm further comprises a pocket into which said optical lens filter is slidably disposed and secured.

13. The camera of claim 12 wherein said support element further comprises a limiting arm projecting in a direction opposing said filter arm, said limiting arm engaged with a generally U-shaped stopping element.

14. The camera of claim 13 wherein said limiting arm is disposed intermediate of upturned arms of said stopping element.

15. The camera of claim 10 wherein said filter arm further comprises an outer periphery having at least one tab and a shoulder for retaining said optical lens filter.

16. The camera of claim 15 further comprising a pair of stopping elements disposed at opposing sides of a device housing.

17. The camera of claim 10 wherein said filter arm further comprises an elongated shaft.

18. The camera of claim 17 wherein said shaft is engaged with a filter bracket retaining said optical lens filter.

19. The camera of claim 1 wherein said electromechanical device further comprises a device housing and a housing coverplate.

20. The camera of claim 19 wherein said device housing and said housing coverplate each further comprise an optical path aperture axially aligned along said optical path of said camera.

21. The camera of claim 19 wherein said device housing further comprises a two-part device housing.

22. The camera of claim 21 wherein said two-part device housing further comprises:
    a first housing part having a trunnion support; and
    a second housing part joined to said first housing part, said second housing part having a trunnion support, a generally arcuate channel and an optical path aperture.

23. The camera of claim 1 wherein said secondary magnet is a permanent magnet.

24. The camera of claim 23 wherein said support element further comprises a pair of opposing trunnions protruding from a main body having an internal cavity, and said trunnions being axially spaced and coaxially aligned along said pivot axis.

25. The camera of claim 24 wherein said permanent magnet is retained within said internal cavity of said main body and is intermediate of said opposing trunnions.

26. The camera of claim 25 wherein said pivot axis is generally aligned intermediate of the magnetic poles of said permanent magnet.

27. An electromechanical device for selectively inserting an optical lens filter into an optical path of a digital camera, said electromechanical device comprising:
    a device housing having a housing coverplate removably attached thereto;
    an electromagnet comprising an electromagnetically inductive coil wound around a bobbin, and said bobbin having an axial channel with an armature disposed therein;
    a support element comprising a body and a cantilevered filter arm, said body further comprising a magnet and opposing trunnions axially spaced and coaxially aligned along an axis; and
    at least one optical lens filter engaged with said filter arm of said support element;
    wherein opposing magnetic fields generated by said electromagnet and said magnet pivot said support element about said axis to selectively move said optical lens filter.

28. The electromechanical device of claim 27 wherein said axial channel of said bobbin is substantially perpendicular to said pivot axis.

29. The electromechanical device of claim 27 wherein said armature is generally U-shaped and further comprises a pair of pole pieces directing the magnetic field generated by said electromagnet towards said magnet.

30. The electromechanical device of claim 27 wherein said armature is constructed of a ferromagnetic metal or a ferromagnetic compound.

31. The electromechanical device of claim 27 wherein said magnet is a permanent magnet.

32. The electromechanical device of claim 27 wherein said opposing trunnions are rotatably engaged with said device housing and said housing coverplate.

33. The electromechanical device of claim 27 wherein said device housing is a two-part device housing comprising a first housing part and a second housing part.

34. The electromechanical device of claim 33 wherein said opposing trunnions are rotatably engaged with trunnion supports of said two-part device housing.

35. The electromechanical device of claim 33 further comprising a filter bracket slidably engaged with said two-part device housing.

36. The electromechanical device of claim 27 further comprising a filter bracket retaining said optical lens filter.

37. The electromechanical device of claim 36 wherein said filter arm further comprises an elongated shaft engaged with said filter bracket.

38. The electromechanical device of claim 27 further comprising a stopping element disposed within said device housing.

39. The electromechanical device of claim 38 wherein said support element further comprises a limiting arm projecting in a direction opposing said cantilevered filter arm, and said limiting arm engaged with said stopping element.

40. The electromechanical device of claim 39 wherein said stopping element is a plurality of stopping elements each disposed within said device housing.

41. The electromechanical device of claim 27 wherein said filter arm further comprises an outer periphery having at least one tab and a shoulder for retaining said optical lens filter.

42. The electromechanical device of claim 27 wherein said device housing and said housing coverplate each have an optical path aperture.

* * * * *